United States Patent
Hattori et al.

(10) Patent No.: US 8,327,708 B2
(45) Date of Patent: Dec. 11, 2012

(54) ACCELERATION SENSOR

(75) Inventors: Isao Hattori, Osaka (JP); Toshiyuki Nozoe, Kyoto (JP)

(73) Assignee: Panasonic Corporation, Osaka (JP)

( * ) Notice: Subject to any disclaimer, the term of this patent is extended or adjusted under 35 U.S.C. 154(b) by 539 days.

(21) Appl. No.: 12/594,862

(22) PCT Filed: Apr. 1, 2009

(86) PCT No.: PCT/JP2009/001526
§ 371 (c)(1),
(2), (4) Date: Oct. 6, 2009

(87) PCT Pub. No.: WO2009/122741
PCT Pub. Date: Oct. 8, 2009

(65) Prior Publication Data
US 2012/0125102 A1  May 24, 2012

(30) Foreign Application Priority Data

Apr. 4, 2008 (JP) ................. 2008-097917
Apr. 4, 2008 (JP) ................. 2008-097918

(51) Int. Cl.
*G01P 15/125* (2006.01)
(52) U.S. Cl. .................................... 73/514.32
(58) Field of Classification Search ............. 73/514.32
See application file for complete search history.

(56) References Cited

U.S. PATENT DOCUMENTS
6,257,061 B1    7/2001  Nonoyama et al.
2005/0072233 A1*  4/2005  Nozoe ................. 73/514.16

FOREIGN PATENT DOCUMENTS
| JP | 11-118827 A | 4/1999 |
| JP | 2000-81449 A | 3/2000 |
| JP | 2001-221810 A | 8/2001 |
| JP | 2004-061280 A | 2/2004 |
| JP | 2004-347530 A | 12/2004 |
| JP | 2007-248327 | * 9/2007 |
| JP | 2007-248327 A | 9/2007 |

OTHER PUBLICATIONS
International Search Report for PCT/JP2008/001526.
Machine Translation of JP 2004-061280 dated Feb. 26, 2004, previously cited in Information Disclosure Statement dated Oct. 6, 2009.
Machine Translation of JP 2004-347530 dated Dec. 9, 2004, previously cited in Information Disclosure Statement dated Oct. 6, 2009.
Machine Translation of JP 2007-248327 dated Sep. 27, 2007, previously cited in Information Disclosure Statement dated Oct. 6, 2009.

* cited by examiner

*Primary Examiner* — Hezron E Williams
*Assistant Examiner* — Gregory J Redmann
(74) *Attorney, Agent, or Firm* — Pearne & Gordon LLP

(57) ABSTRACT

An acceleration sensor includes a driver circuit for outputting a biased alternating-current (AC) voltage having a variable bias voltage, a detector element having a capacitance provided between a fixed electrode and a movable electrode changing depending on acceleration applied to the detector element, a current-voltage (C/V) converter for converting a current output from the movable electrode of the detector element into a voltage and outputting the voltage, a first operational amplifier outputting a voltage depending on the input voltage, a synchronous demodulator for synchronously detecting the voltage output from the first operational amplifier, and a defect detector for outputting a defect detection signal when the defect detector determines that the voltage output from the first operational amplifier is out of a predetermined range while the biased AC voltage output from the driver circuit is a predetermined voltage. This acceleration sensor can have a small size.

13 Claims, 16 Drawing Sheets

ACCELERATION SENSOR

TECHNICAL FIELD

The present invention relates to an acceleration sensor used in vehicles for example.

BACKGROUND ART

FIG. 16 is a circuit diagram of conventional acceleration sensor 501 described in Patent Document 1. Acceleration sensor 501 includes detector element 1 for changing an output according to acceleration, driver circuit 2 for inputting an AC bias voltage signal to detector element 1, and detector circuit 3 for outputting an acceleration signal based on the output of detector element 1. Detector element 1 includes fixed electrodes 4A and 4B, and movable electrodes 5A and 5B disposed between these fixed electrodes 4A and 4B. Respective one ends of movable electrodes 5A and 5B are connected to driver circuit 2.

Acceleration applied to detector element 1 of acceleration sensor 501 causes movable electrodes 5A and 5B to swing like a pendulum with the one ends as fulcrum, hence changing a distance between fixed electrode 4A and movable electrode 5A and a distance between fixed electrode 4B and movable electrode 5B. The changes of the distances change a capacitance generated between movable electrode 5A and fixed electrode 4A and a capacitance generated between movable electrode 5B and fixed electrode 4B. Detector circuit 3 then detects the acceleration based on these changes in the capacitances.

Detector circuit 3 includes operational amplifiers 6 and 7, differential amplifier 8 for amplifying a difference between outputs of operational amplifiers 6 and 7, and defect detector 12 connected to an output port of differential amplifier 8. Operational amplifier 6 has input port 6A receiving an output of fixed electrode 4A, and input port 6B selectively connected to reference voltage generator 9A and variable voltage generator 10A. Operational amplifier 7 has input port 7A receiving an output of fixed electrode 4B, and second input port 7B selectively connected to reference voltage generator 9B and variable voltage generator 10B. Resistor 11A is connected between input port 6A and output port 6C of operational amplifier 6. Resistor 11B is connected between input port 7A and output port 7C of operational amplifier 7.

While no acceleration is applied to detector element 1, movable voltage generators 10A and 10B are connected to input ports 6B and 7B, respectively, and respective voltages to variable voltage generators 10A and 10B are determined to be predetermined voltages so as to apply acceleration virtually to detector element 1 to detect a defect in detector element 1.

More specifically, if the voltages of variable voltage generators 10A and 10B are determined to be 1.5V and 3.5V, respectively, movable electrode 5B moves towards fixed electrode 4B, and movable electrode 5A moves away from fixed electrode 4A. This movement changes a capacitance produced between fixed electrode 4A and movable electrode 5A, and a capacitance produced between fixed electrode 4B and movable electrode 5B, hence generating currents. These currents run through resistors 11A and 11B, and generate voltages at resistors 11A and 11B. These voltages are input to differential amplifier 8, and an output signal from differential amplifier 8 is sent to defect detector 12.

Defect detector 12 determines that there is no defect if the output signal of differential amplifier 8 is within a predetermined voltage range. If the output signal is out of the predetermined voltage range, defect detector 12 determines that there is a defect. For example, if fixed electrode 4A is defective, no current is generated from fixed electrode 4A, and thus no voltage is generated in resistor 11A. Accordingly, the output signal from differential amplifier 8 exceeds the predetermined voltage range, and therefore, defect detector 12 determines that there is a defect in detector element 1.

Conventional acceleration sensor 501 requires at least two variable voltage generators 10A and 10B for detecting a defect, hence preventing acceleration sensor 501 from having a small size.

Patent Document 1: JP2007-248327A

SUMMARY OF THE INVENTION

An acceleration sensor includes a driver circuit for outputting a biased alternating-current (AC) voltage having a variable bias voltage, a detector element having a capacitance provided between a fixed electrode and a movable electrode changing depending on acceleration applied to the detector element, a current-voltage (C/V) converter for converting a current output from the movable electrode of the detector element into a voltage and outputting the voltage, a first operational amplifier outputting a voltage depending on the input voltage, a synchronous demodulator for synchronously detecting the voltage output from the first operational amplifier, and a defect detector for outputting a defect detection signal when the defect detector determines that the voltage output from the first operational amplifier is out of a predetermined range while the biased AC voltage output from the driver circuit is a predetermined voltage.

This acceleration sensor can have a small size.

REFERENCE NUMERALS

21 Driver Circuit
22 Detector Element
22A Fixed Electrode
22B Movable Electrode (First Movable Electrode)
23 Current-Voltage Converter (First Current-Voltage Converter)
25 Operational Amplifier (First Operational Amplifier)
26 Synchronous Demodulator
29 Defect Detector
30 Oscillator
31 Operational Amplifier (Second Operational Amplifier)
33A Movable Electrode (First Movable Electrode)
33B Movable Electrode (Second Movable Electrode)
34A Current-Voltage Converter (First Current-Voltage Converter)
34B Current-Voltage Converter (Second Current-Voltage Converter)
41 Driver Circuit
42 Detector Element
42A Fixed Electrode
43A Movable Electrode (First Movable Electrode)
43B Movable Electrode (Second Movable Electrode)
43C Movable Electrode (Third Movable Electrode)
43D Movable Electrode (Fourth Movable Electrode)
44A Current-Voltage Converter (First Current-Voltage Converter)
44B Current-Voltage Converter (Second Current-Voltage Converter)
44C Current-Voltage Converter (Third Current-Voltage Converter)
44D Current-Voltage Converter (Fourth Current-Voltage Converter)
45 Differential Amplifier (First Differential Amplifier)
47 Synchronous Demodulator (First Synchronous Demodulator)
48 Differential Amplifier (Second Differential Amplifier
50 Synchronous Demodulator (Second Synchronous Demodulator)
53 Oscillator
54 Operational Amplifier
56 Defect Detector (First Defect Detector)
57 Defect Detector (Second Defect Detector)
58 Phase Shifter (First Phase Shifter)
59 Phase Shifter (Second Phase Shifter)
60 Amplifier (First Amplifier)
61 Amplifier (Second Amplifier)
122 Detector Element

DETAILED DESCRIPTION OF PREFERRED EMBODIMENTS

Exemplary Embodiment 1

Figure 1:
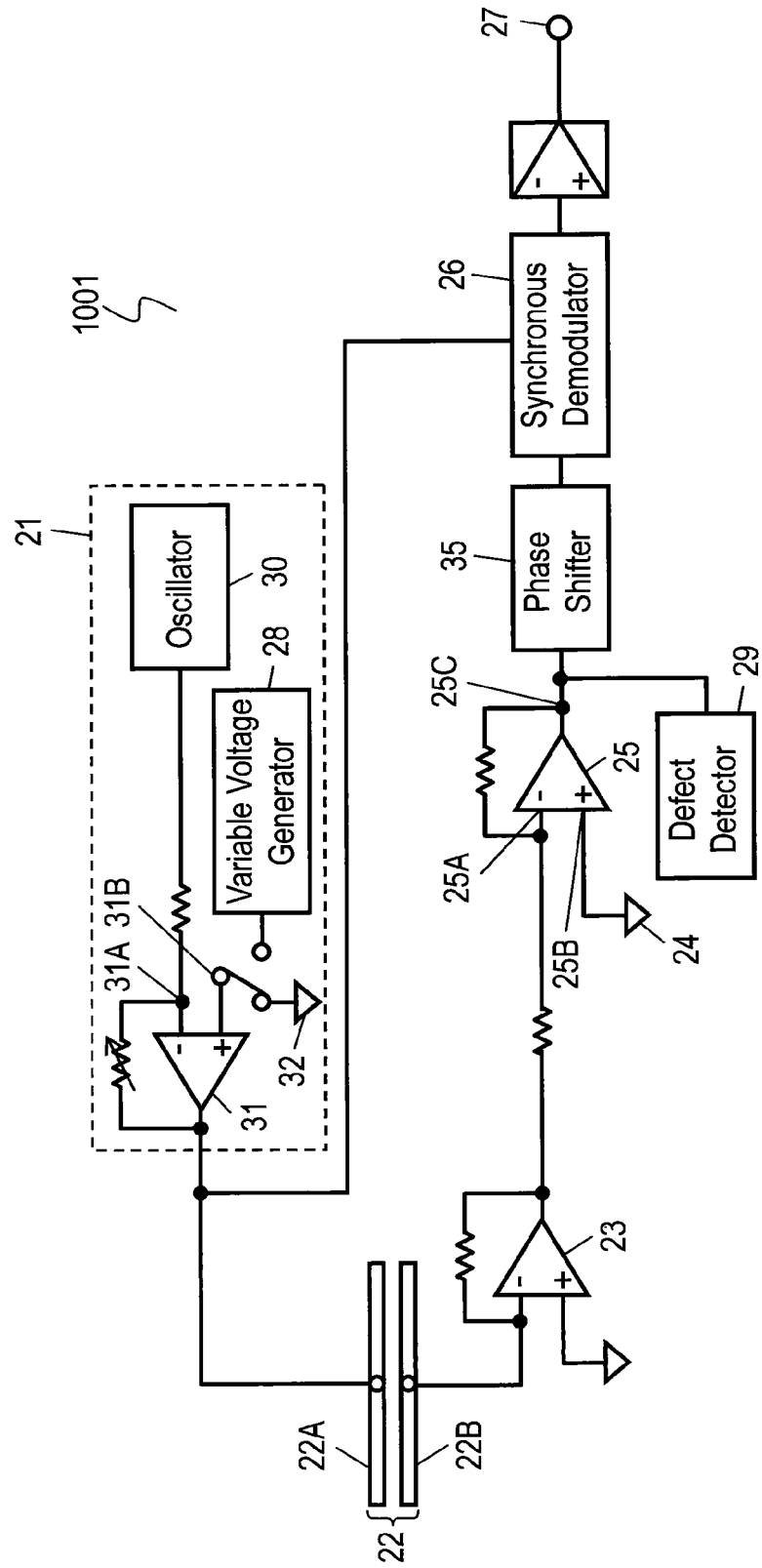
FIG. 1 is a circuit diagram of an acceleration sensor in accordance with Exemplary Embodiment 1 of the present invention.

FIG. 1 is a circuit diagram of acceleration sensor 1001 according to Exemplary Embodiment 1 of the present invention. Acceleration sensor 1001 includes driver circuit 21 for outputting a biased alternating-current (AC) voltage, detector element 22 receiving the biased AC voltage, current-voltage (C/V) converter 23 having an input port connected to detector element 22, operational amplifier 25 having input port 25A connected to an output port of C/V converter 23, reference voltage generator 24 connected to input port 25B of operational amplifier 25, synchronous demodulator 26 coupled to output port 25C of operational amplifier 25, and sensor output terminal 27 electrically connected to synchronous demodulator 26. Phase shifter 35 is connected between output port 25C of operational amplifier 25 and synchronous demodulator 26.

Driver circuit 21 includes variable voltage generator 28. A bias voltage of the biased AC voltage is variable. More specifically, driver circuit 21 includes oscillator 30, operational amplifier 31 having input port 31A which is an inverting input port receiving an output from oscillator 30, reference voltage generator 32 for generating reference voltage Vref, and variable voltage generator 28 for generating a variable voltage. Reference voltage Vref is, for example, 2.5V which is a virtual ground potential. Reference voltage Vref from reference voltage generator 32 and a variable voltage from variable voltage generator 28 are selectively input to input port 31B which is a non-inverting input port of operational amplifier 31. An output port of operational amplifier 31 is electrically connected to detector element 22. The variable voltage changes, and the bias voltage of the biased AC voltage output from driver circuit 21 changes accordingly.

Detector element 22 includes fixed electrode 22A receiving the biased AC voltage from driver circuit 21, and movable electrode 22B facing fixed electrode 22A. Movable electrode 22B is connected to C/V converter 23.

Movable electrode 22B provides a capacitance between fixed electrode 22A and movable electrode 22B. The capacitance changes according to the distance between electrodes 22A and 22B as the distance changes due to acceleration.

Defect detector 29 is connected to the output port of operational amplifier 25. Defect detector 29 outputs a defect detection signal if an amplitude of the AC voltage output from operational amplifier 25 is not within a predetermined voltage range while the bias voltage of the biased AC voltage output from driver circuit 21 is a predetermined voltage. On the other hand, defect detector 29 does not output the defect detection signal if the amplitude of the AC voltage output from operational amplifier 25 is within the predetermined range while the bias voltage of the biased AC voltage output from driver circuit 21 is the predetermined voltage. In this case, operational amplifier 25 outputs a voltage corresponding to the voltage output from C/V converter 23.

More specifically, when detector element 22 operates properly, the distance between fixed electrode 22A and movable electrode 22B becomes shorter as the bias voltage of the biased AC voltage output from driver circuit 21 is increased. This increases the capacitance between fixed electrode 22A and movable electrode 22B, and increases the amplitude of an AC voltage output from operational amplifier 25. If detector element 22 has a defect and includes movable electrode 22B which does not move, the amplitude of the AC voltage output from operational amplifier 25 does not reach the predetermined range even if the bias voltage of the biased AC voltage output from driver circuit 21 is increased. Defect detector 29 therefore outputs the defect detection signal when defect detector 29 determines that the amplitude of AC voltage output from operational amplifier 25 does not reach the predetermined range. If detector element 22 has no defect and includes movable electrode 22B which is movable, the amplitude of AC voltage output from operational amplifier 25 reaches the predetermined range according to the increasing of the bias voltage of the biased AC voltage output from driver circuit 21. If defect detector 29 determines that the amplitude of AC voltage output from operational amplifier 25 reaches the predetermined range, defect detector 29 does not output the defect detection signal.

Acceleration sensor 1001 can detect a defect in detector element 1 by changing only the voltage output from driver circuit 21 including single variable voltage generator 28.

Since variable voltage generator 28 usually has a certain volume, acceleration sensor 1001 does not need two or more variable voltage generators, hence allowing the acceleration sensor to have a small size.

Figure 2:
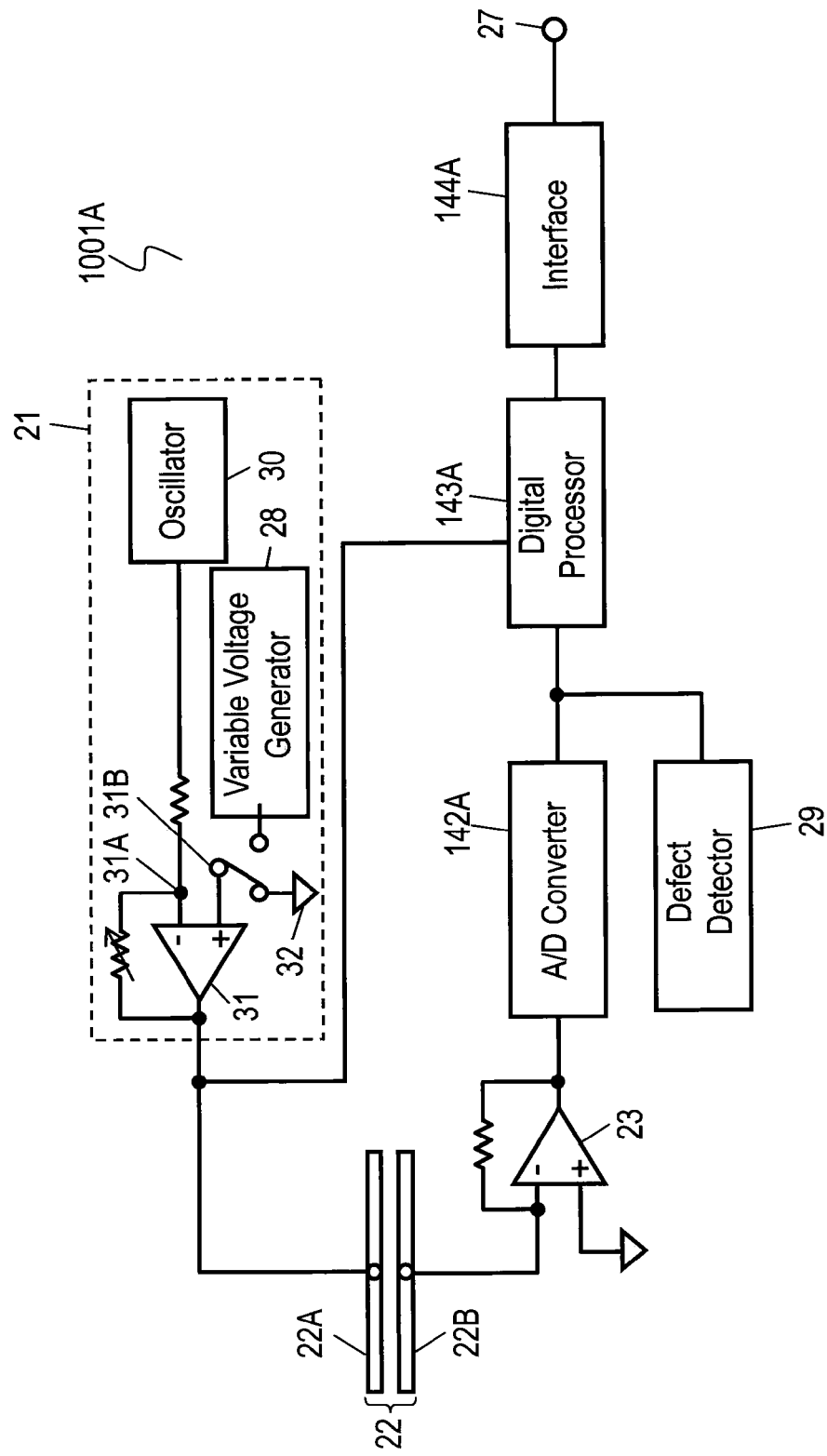
FIG. 2 is a circuit diagram of another acceleration sensor in accordance with Embodiment 1.

FIG. 2 is a circuit diagram of another acceleration sensor 1001A according to Embodiment 1. In FIG. 2, components identical to those of acceleration sensor 1001 shown in FIG. 1 are denoted by the same reference numerals, and their description will be omitted. Acceleration sensor 1001 shown in FIG. 1 is implemented by an analog circuit. Acceleration sensor 1001A includes analog-digital (A/D) converter 142A, digital processor 143A, and interface 144A; instead of operational amplifier 25 and synchronous demodulator 26 in acceleration sensor 1001. Analog-digital converter 142A converts voltage output from C/V converter 23 to a digital signal. Digital processor 143A includes a digital synchronous demodulator for synchronously demodulating an output of A/D converter 142A, and a digital filter. Interface 144A converts a signal output from digital processor 143A to a signal in a predetermined digital format. Thus, acceleration sensor 1001A shown in FIG. 2 is implemented by a digital circuit and has the same effects as acceleration sensor 1001.

Exemplary Embodiment 2

Figure 3:
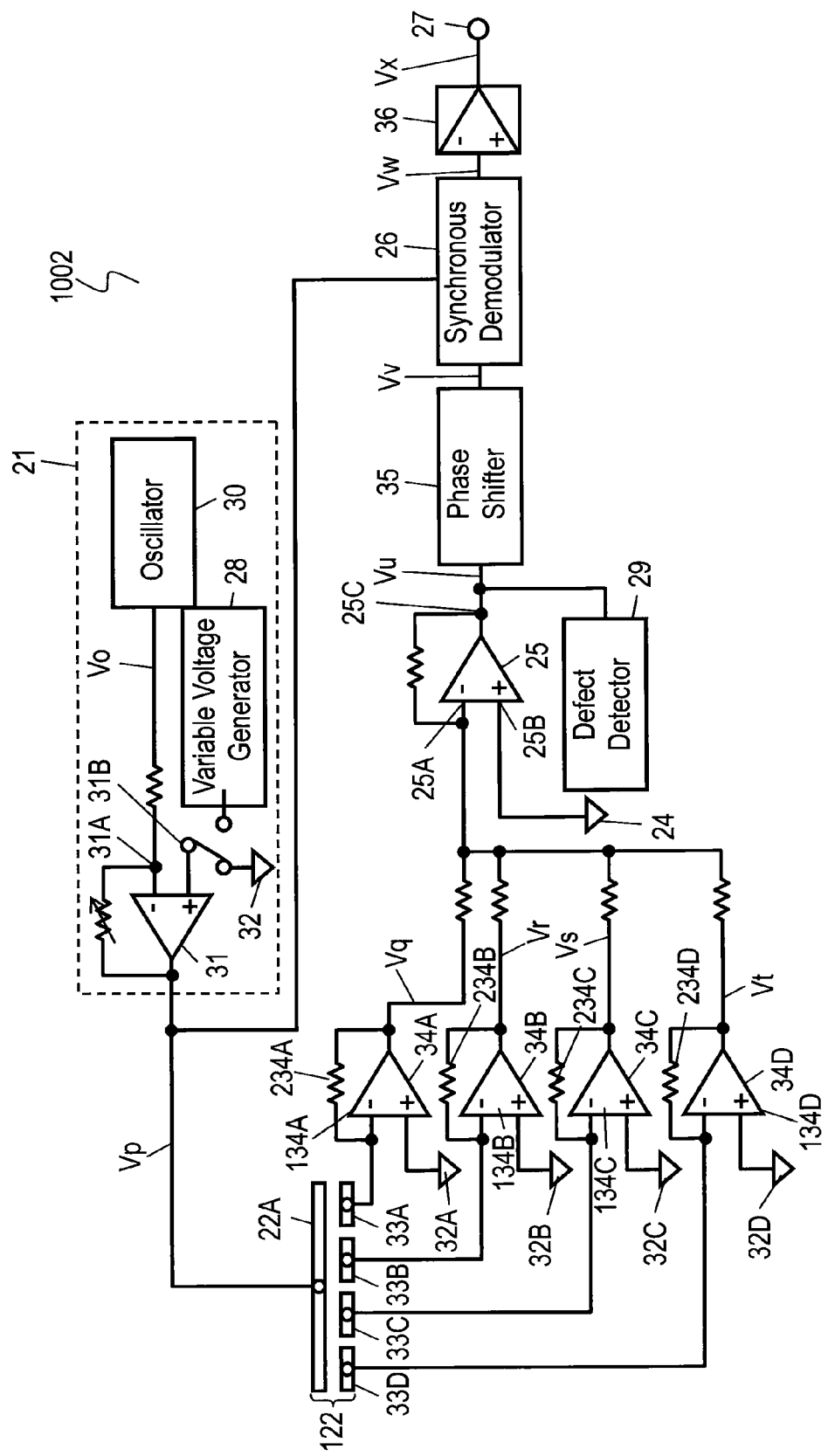
FIG. 3 is a circuit diagram of an acceleration sensor in accordance with Exemplary Embodiment 2 of the invention.

FIG. 3 is a circuit diagram of acceleration sensor 1002 according to Exemplary Embodiment 2 of the present invention. In FIG. 3, components identical to those of acceleration sensor 1001 shown in FIG. 1 are denoted by the same reference numerals, and their description will be omitted. Detector element 122 includes fixed electrode 22A and movable electrodes 33A, 33B, 33C, and 33D facing fixed electrode 22A. Movable electrodes 33A, 33B, 33C, and 33D are connected to input ports of current-voltage (C/V) converters 34A, 34B, 34C, and 34D, respectively. Output ports of C/V converters 34A, 34B, 34C, and 34D are connected to input port 25A of operational amplifier 25. Operational amplifier 25 functions as an adder for summing voltages output from C/V converters 34A, 34B, 34C, and 34D.

Figure 4:
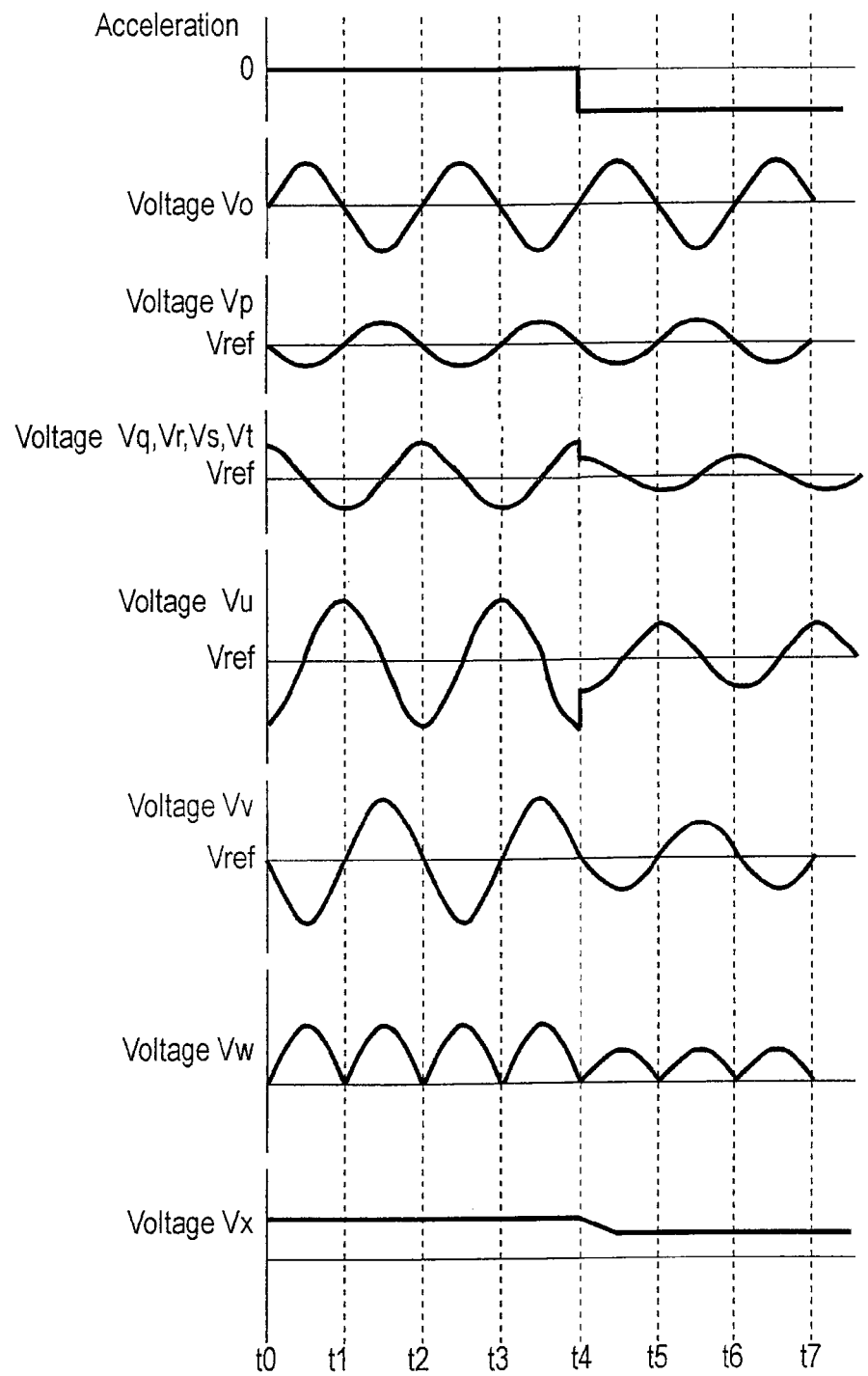
FIG. 4 illustrates voltages of the acceleration sensor in accordance with Embodiment 2 for detecting acceleration.

An operation of acceleration sensor 1002 for detecting acceleration will be described below. Input port 31B of operational amplifier 31 is connected to reference voltage generator 32. FIG. 4 shows voltages in acceleration sensor 1002 detecting the acceleration. Oscillator 30 outputs voltage Vo which is a sine-wave AC voltage. Voltage Vo is input to input port 31A of operational amplifier 31 which is an inverting input port. Operational amplifier 31 inverts sine-wave voltage Vo to voltage Vp, and supplies applies voltage Vp to fixed electrode 22A of detector element 122.

A sine-wave current is output from movable electrode 33A based on voltage Vp and a capacitance determined by a distance between fixed electrode 22A and movable electrode 33A of detector element 122. This current is converted into voltage Vq by C/V converter 34A. C/V converter 34A includes reference voltage generator 32A generating reference voltage Vref; operational amplifier 134A which has an inverting input port, a non-inverting input port, and an output port, and resistor 234A connected between the output port and the inverting input port of operational amplifier 134A. Movable electrode 33A is connected to the inverting input port of operational amplifier 134A. Reference voltage generator 32A is connected to a non-inverting input port of operational amplifier 134A. Operational amplifier 134A outputs voltage Vq from the output port thereof.

Similarly, a sine-wave current is output from movable electrode 33B based on voltage Vp and a capacitance determined by a distance between fixed electrode 22A and movable electrode 33B. This current is converted into voltage Vr by C/V converter 34B. C/V converter 34B includes reference voltage generator 32B for generating reference voltage Vref, operational amplifier 134B which has an inverting input port, a non-inverting input port, and an output port, and resistor 234B connected between the output port and the inverting input port of operational amplifier 134B. Movable electrode 33B is connected to the inverting input port of operational amplifier 134B. Reference voltage generator 32B is connected to the non-inverting input port of operational amplifier 134B. Operational amplifier 134B outputs voltage Vr from the output port thereof.

A sine-wave current is output from movable electrode 33C based on voltage Vp and a capacitance determined by a distance between fixed electrode 22A and movable electrode 33C. This current is converted into voltage Vs by C/V converter 34C. C/V converter 34C includes reference voltage generator 32C for generating reference voltage Vref, operational amplifier 134C which has an inverting input port, a non-inverting input port, and an output port, and resistor 234C connected between the output port and the inverting input port of operational amplifier 134C. Movable electrode 33C is connected to the inverting input port of operational amplifier 134C. Reference voltage generator 32C is connected to the non-inverting input port of operational amplifier 134C. Operational amplifier 134C outputs voltage Vs from the output port thereof.

A sine-wave current is output from movable electrode 33D based on voltage Vp and a capacitance determined by a distance between fixed electrode 22A and movable electrode 33D. This current is converted into voltage Vt by C/V converter 34D. C/V converter 34D includes reference voltage generator 32D for generating reference voltage Vref, operational amplifier 134D which has an inverting input port, a non-inverting input port, and an output port, and resistor 234D connected between the output port and the inverting input port of operational amplifier 134D. Movable electrode 33D is connected to the inverting input port of operational amplifier 134D. Reference voltage generator 32D is connected to the non-inverting input port of operational amplifier 134D. Operational amplifier 134D outputs voltage Vt from the output port thereof.

Voltages Vq, Vr, Vs, and Vt are added and input to input port 25A which is an inverting input port of operational amplifier, and operational amplifier 25 outputs voltage Vu from output port 25C.

Voltage Vu output from operational amplifier 25 is input to phase shifter 35 connected between operational amplifier 25 and synchronous demodulator 26. Phase shifter 35 shifts the phase of voltage Vu to produce voltage Vv so as to match a zero-crossing point where voltage Vp output from driver circuit 21 crosses the reference voltage and a zero-crossing point where voltage Vu output from operational amplifier 25 crosses reference voltage Vref, thus matching the phases of voltages of Vp and Vu to output voltage Vv to synchronous demodulator 26.

Synchronous demodulator 26 synchronously detects voltage Vv output from phase shifter 35 using voltage Vp output from driver circuit 21 as a reference signal, and produces voltage Vw produced by inverting a negative portion of voltage Vv to positive, thus outputting voltage Vw to amplifier 36.

Amplifier 36 smoothes voltage Vw output from synchronous demodulator 26, and outputs voltage Vx from sensor output terminal 27.

As shown in FIG. 4, when acceleration decreases at time point t4, the distance between fixed electrode 22A and movable electrode 33A, the distance between fixed electrode 22A and movable electrode 33B, the distance between fixed electrode 22A and movable electrode 33C, and the distance between fixed electrode 22A and movable electrode 33D increase, and decrease each capacitance. Amplitudes of voltages Vq, Vr, Vs, and Vt output from C/V converters 34A, 34B, 34C, and 34D decrease accordingly. Accordingly, an amplitude of voltage Vu output from operational amplifier 25, an amplitude of voltage Vv output from phase shifter 35, an amplitude of voltage Vw output from synchronous demodulator 26, and voltage Vx output from amplifier 36 decrease to allow the acceleration to be detectable based on the decreasing of voltage Vx.

Figure 5:
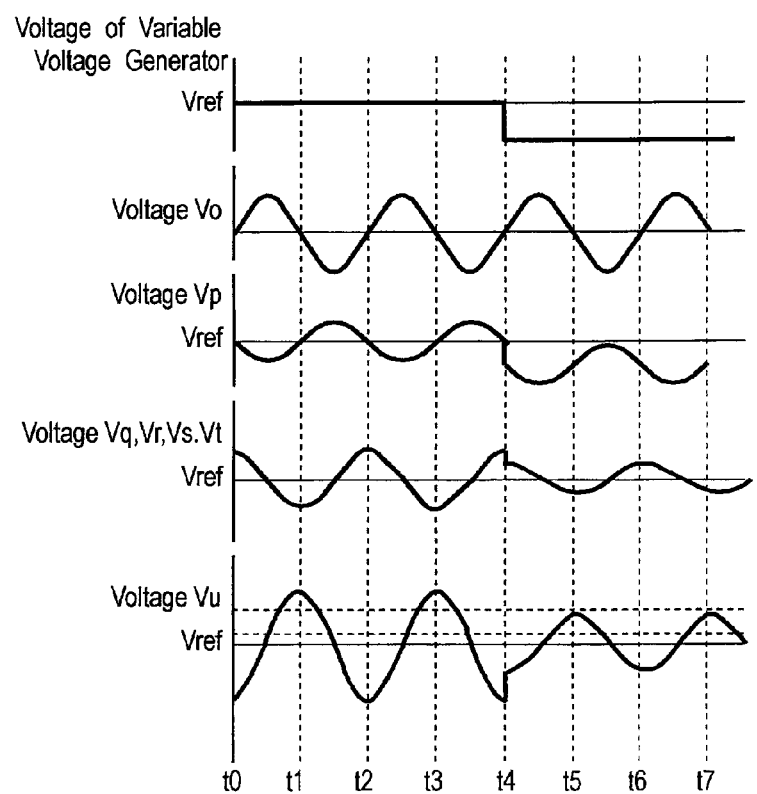
FIG. 5 illustrates waveforms of the acceleration sensor in accordance with Embodiment 2 for detecting defect.

Next, an operation of acceleration sensor 1002 detecting a defect will be described. Input port 31B of operational amplifier 31 shown in FIG. 3 is connected to variable voltage generator 28. FIG. 5 shows voltages in acceleration sensor 1002 detecting a defect.

Oscillator 30 shown in FIG. 3 outputs sine-wave voltage Vo. Sine-wave voltage Vo is input to input port 31A which is an inverting input port of operational amplifier 31, and operational amplifier 31 outputs voltage Vp provided by inverting voltage Vo.

Voltage Vp is applied to fixed electrode 22A of detector element 22. Sine-wave currents are output from movable electrodes 33A, 33B, 33C, and 33D of detector element 22 based on voltage Vp and capacitances determined by a distance between fixed electrode 22A and movable electrode 33A, a distance between fixed electrode 22A and movable electrode 33B, a distance between fixed electrode 22A and movable electrode 33C, and a distance between fixed electrode 22A and movable electrode 33D, respectively. These currents are converted into voltages Vq, Vr, Vs, and Vt by voltage converters 34A, 34B, 34C, and 34D, respectively. Voltages Vq, Vr, Vs, and Vt are output to input port 25A of operational amplifier 25. As shown in FIG. 5, operational amplifier 25 outputs voltage Vu from output port 25C thereof.

As shown in FIG. 5, the voltage of variable voltage generator 28 of driver circuit 21 is decreased at time point t4, accordingly decreasing a direct-current (DC) bias voltage of voltage Vp output from the output port of operational amplifier 31 of driver circuit 41. This increases the distance between fixed electrode 22A and movable electrode 33A, the distance between fixed electrode 22A and movable electrode 33B, the distance between fixed electrode 22A and movable electrode 33C, and the distance between fixed electrode 22A and movable electrode 33D, and decrease the capacitances. Amplitudes of voltages Vq, Vr, Vs, and Vt output from C/V converters 34A, 34B, 34C, and 34D decrease accordingly. Accordingly, the amplitude of voltage Vu output from operational amplifier 25 decreases. Defect detector 29 detects the decreasing of the amplitude of voltage Vu, and determines that no defect exists if the maximum value of voltage Vu is within a predetermined range, thus outputting no defect detection signal.

On the other hand, if detector element 122 has a defect in at least one of movable electrodes 33A, 33B, 33C, and 33D, voltage Vu output from operational amplifier 25 decreases. If defect detector 29 determines that the maximum value of voltage Vu is not within the predetermined range, defect detector 29 outputs the defect detection signal.

Thus, acceleration sensor 1002 can detect a defect in detector element 122 only by changing voltage Vp output from driver circuit 21. Variable voltage generator 28 for each of movable electrodes 33A to 33D is not necessary. Variable voltage generator 28 has a certain volume, and allows acceleration sensor 1002 to have a small size.

Figure 6:
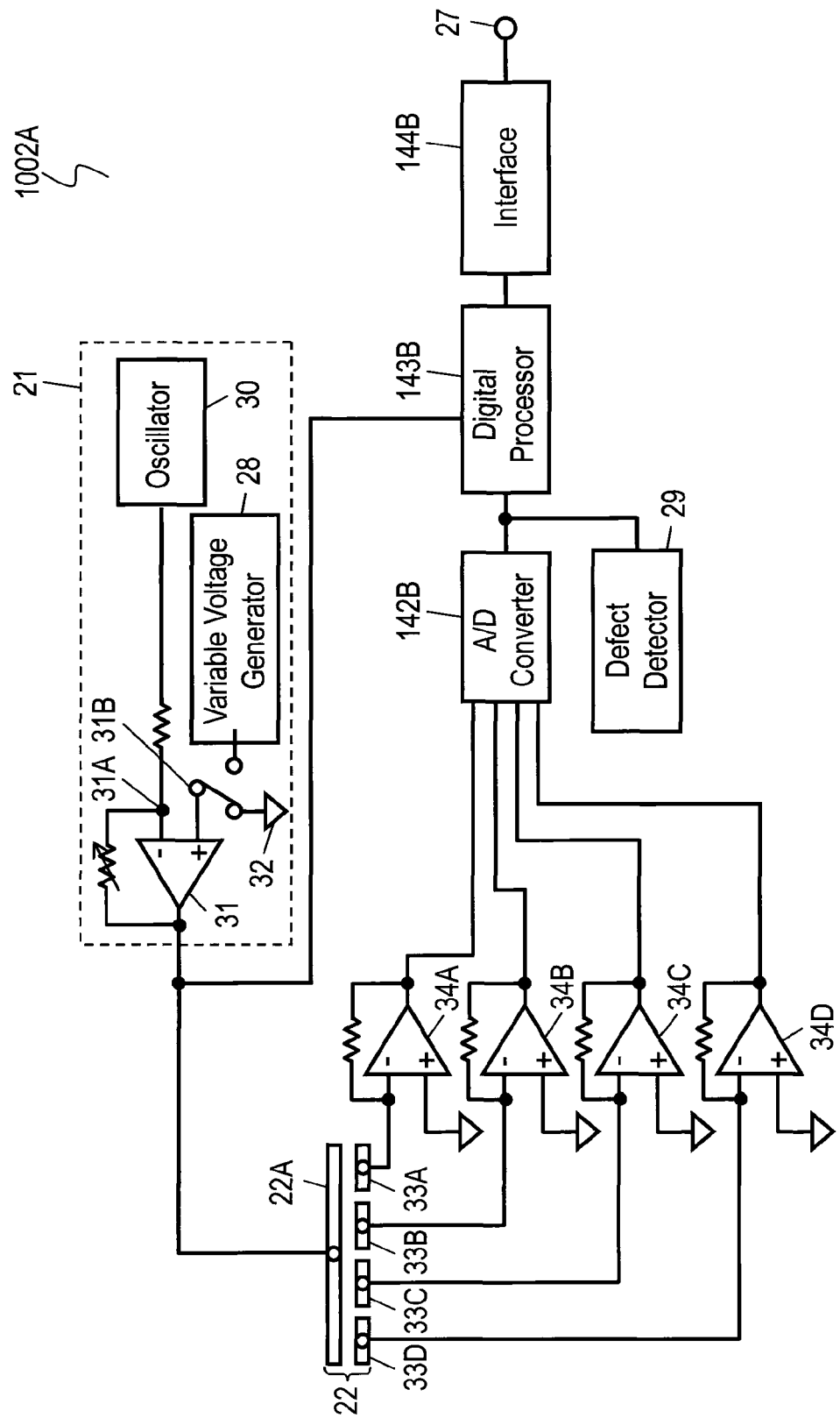
FIG. 6 is a circuit diagram of another acceleration sensor in accordance with Embodiment 2.

FIG. 6 is a circuit diagram of another acceleration sensor 1002A according to Exemplary Embodiment 2. In FIG. 6, components identical to those of acceleration sensor 1002 shown in FIG. 3 are denoted by the same reference numerals, and their description will be omitted. Acceleration sensor 1002 shown in FIG. 3 is implemented by an analog circuit. Acceleration sensor 1002A includes analog-digital converter 142B, digital processor 143B, and interface 144B instead of operational amplifier 25 and synchronous demodulator 26 in acceleration sensor 1002 shown in FIG. 3. Analog-digital converter 142B converts a voltage provided by summing voltages Vq, Vr, Vs, and Vt output from C/V converters 34A, 34B, 34C, and 34D into a digital signal. Digital processor 143B includes a digital synchronous demodulator for synchronously demodulating the output of analog-digital converter 142B, and a digital filter. Interface 144B converts a signal output from digital processor 143B to a signal in a predetermined digital format. Thus, acceleration sensor 1002A shown in FIG. 6 is implemented by a digital circuit and provides the same effects as acceleration sensor 1002.

Exemplary Embodiment 3

Figure 7:
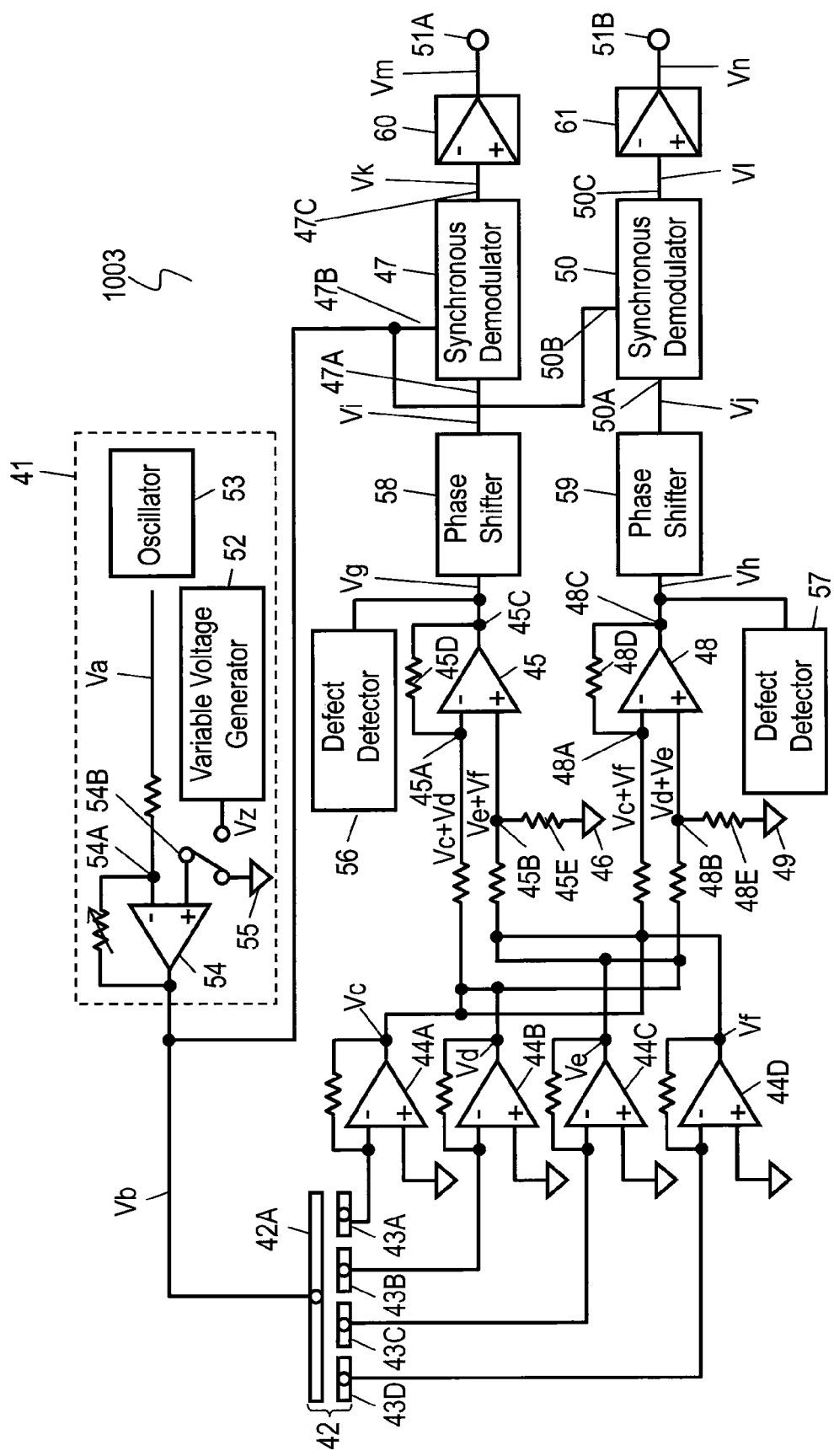
FIG. 7 is a circuit diagram of an acceleration sensor in accordance with Exemplary Embodiment 3 of the invention.

FIG. 7 is an electric diagram of acceleration sensor 1003 according to Exemplary Embodiment 3 of the present invention. Acceleration sensor 1003 includes detector element 42, driver circuit 41 for generating a biased alternating-current (AC) voltage having a variable bias voltage and applying the biased AC voltage to fixed electrode 42A of detector element 42, C/V converters 44A, 44B, 44C, and 44D having input ports connected to movable electrodes 43A, 43B, 43C, and 43D of detector element 42, respectively, and differential amplifiers 45 and 48. Differential amplifiers 45 and 48 are implemented by operational amplifiers.

Input port 45A which is an inverting input port of differential amplifier 45 is connected to output ports of C/V converters 44A and 44B. Input port 45B which is a non-inverting input port of differential amplifier 45 is connected to output ports of C/V converters 44C and 44D. Resistor 45D is connected between input port 45A and output port 45C of differential amplifier 45. Resistor 45E is connected between input port 45B which is a non-inverting input port of differential amplifier 45 and reference voltage generator 46 that generates reference voltage Vref. Output port 45C of differential amplifier 45 is connected to input port 47A of synchronous demodulator 47 via phase shifter 58. Reference voltage Vref is, for example, a virtual ground potential of 2.5V. Input port 47B of synchronous demodulator 47 is connected to driver circuit 41. Output port 47C of synchronous demodulator 47 is connected to amplifier 60. Amplifier 60 is connected to sensor output terminal 51A.

Input port 48A which is an inverting input port of differential amplifier 48 is connected to output ports of C/V converters 44A and 44D. Input port 48B which is a non-inverting input port of differential amplifier 48 is connected to output ports of C/V converters 44B and 44C. Resistor 48D is connected between input port 48A and output port 48C of differential amplifier 48. Resistor 48E is connected between input port 48B which is a non-inverting input port of differential amplifier 48 and reference voltage generator 49 that generates reference voltage Vref. Output port 48C of differential amplifier 48 is connected to input port 50A of synchronous demodulator 50 via phase shifter 59. Input port 50B of synchronous demodulator 50 is connected to driver circuit 41. Output port 50C of synchronous demodulator 50 is connected to amplifier 61. Amplifier 61 is connected to sensor output terminal 51B.

Driver circuit 41 includes variable voltage generator 52 for changing the bias voltage of the biased AC voltage. More specifically, driver circuit 41 includes oscillator 53 for generating sine-wave voltage Va, operational amplifier 54 having input port 54A which is an inverting input port receiving voltage Va output from oscillator 53, reference voltage generator 55 for generating reference voltage Vref, and variable voltage generator 52 for generating a variable voltage. Reference voltage Vref from reference voltage generator 55 and the variable voltage from variable voltage generator 52 are selectively input to input port 54B which is a non-inverting input port of operational amplifier 54. Fixed electrode 42A of detector element 42 is electrically connected to an output port of operational amplifier 54. Operational amplifier 54 applies biased AC voltage Vb to fixed electrode 42A.

Figure 8:
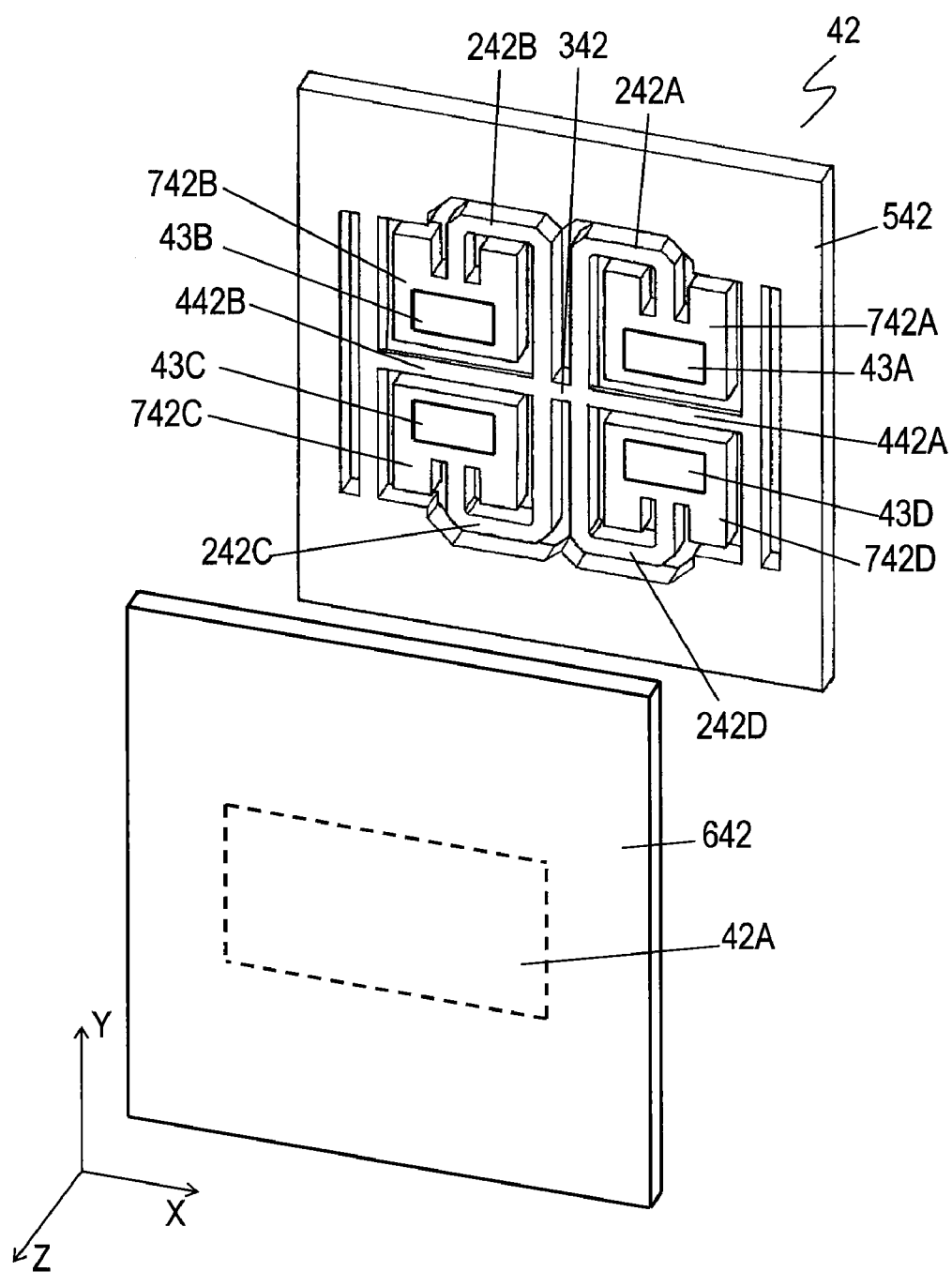
FIG. 8 is an exploded perspective view of a detector element of the acceleration sensor in accordance with the third exemplary embodiment.

FIG. 8 is an exploded perspective view of detector element 42. In FIG. 8, an X-axis, a Y-axis, and a Z-axis crossing perpendicularly to each other are defined. Detector element 42 includes support 342, arms 242A to 242D having a U-shape and extending from support 342, weights 742A to 742D connected to arms 242A to 242D, respectively, arms 442A and 442B extending from support 342 in opposite directions along the X-axis, holder 542 having a frame shape and connected to arms 442A and 442B, and board 642 facing weights 742A to 742D in a direction of the Z-axis. Each of arms 242A to 242D has substantially a U-shape and includes portions which are parallel to each other and extends in a direction of the Y-axis. Weights 742A and 742B are arranged in the direction of the X-axis. Weights 742C and 742D are arranged in the direction of the X-axis. Weights 742A and 742D are arranged in the direction of the Y-axis. Weights 742B and 742C are arranged in the direction of the Y-axis. Movable electrodes 43A to 43D are provided on weights 742A to 742D, respectively. Movable electrodes 43A and 43B are aligned in the X-axis direction. Movable electrodes 43C and 43D are arranged in the direction of the X-axis. Movable electrodes 43A and 43D are arranged in the direction of the Y-axis. Movable electrodes 43B and 43C are arranged in the direction of the Y-axis. Movable electrodes 43A, 43B, 43C, and 43D face fixed electrode 42A.

Acceleration applied to detector element 42 displaces movable electrodes 43A, 43B, 43C, and 43D and changes a distance from each movable electrode to fixed electrode 42A. This changes a capacitance generated between fixed electrode 42A and each of movable electrodes 43A, 43B, 43C, and 43D.

Output port 45C of differential amplifier 45 is connected to defect detector 56. Output port 48C of differential amplifier 48 is connected to defect detector 57. While voltage Vb output from driver circuit 41 is set to a predetermined voltage, if defect detector 56 determines that a voltage output from differential amplifier 45 is not within a predetermined range, defect detector 56 outputs a defect detection signal. While voltage Vb output from driver circuit 41 is set to a predetermined voltage, if defect detector 57 determines that voltage output from differential amplifier 48 is not within the predetermined range, defect detector 57 outputs a defect detection signal.

Figure 10:
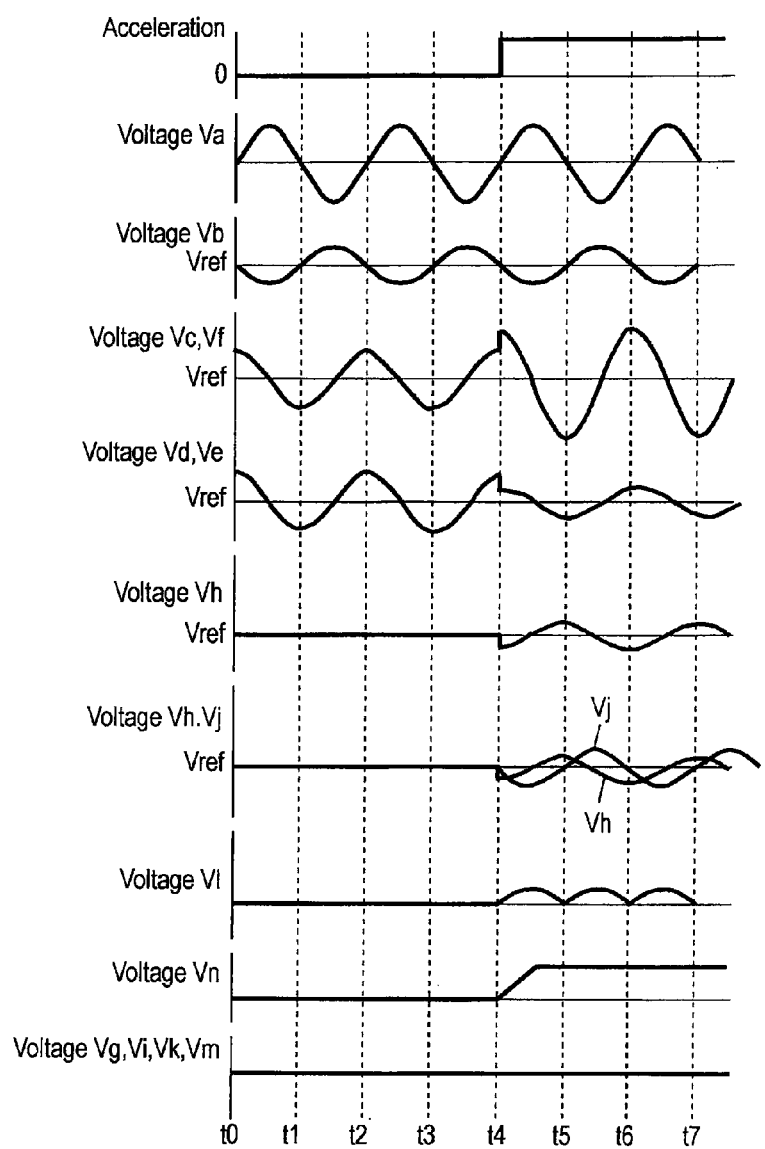
FIG. 10 illustrates voltages of the acceleration sensor in accordance with Embodiment 3 for detecting acceleration.

Next, an operation of acceleration sensor 1003 detecting acceleration in the direction of the X-axis will be described below. Input port 54B of operational amplifier 54 shown in FIG. 7 is connected to reference voltage generator 55. FIG. 10 shows voltages in acceleration sensor 1003 when the acceleration in the direction of the X-axis is applied to detector element 42. During a period from time point t0 to time point t4, no acceleration is applied to detector element 42. Then, acceleration in the direction of the X-axis is applied during a period from time point t4 to time point t7. When the acceleration in the direction of the X-axis is applied to detector element 42, movable electrodes 43A and 43D rise and approach fixed electrode 42A. Accordingly, a distance between fixed electrode 42A and each of movable electrodes 43A and 43D decreases. On the other hand, movable electrodes 43A and 43D move away from fixed electrode 42A, and accordingly, a distance between fixed electrode 42A and each of movable electrodes 43B and 43C increases.

Oscillator 53 of driver circuit 41 shown in FIG. 7 outputs sine-wave voltage Va. Voltage Va is input to input port 54A which is an inverting input port of operational amplifier 54, and voltage Vb provided by inverting voltage Va is output from the output port of operational amplifier 54.

When voltage Vb is applied to fixed electrode 42A of detector element 42, movable electrodes 43A, 43B, 43C, and 43D output sine-wave currents, respectively, based on voltage Vb applied to fixed electrode 42A and a capacitance determined by a distance between fixed electrode 42A and each of movable electrodes 43A to 43D. These sine-wave currents are converted to voltages Vc, Vd, Ve, and Vf by C/V converters 44A, 44B, 44C, and 44D, respectively.

Voltages Vc and Vd are summed and input to input port 45A of differential amplifier 45. Voltages Ve and Vf are summed and input to input port 45B of differential amplifier 45.

At this moment, voltages Vc and Vf are summed and input to input port 48A of differential amplifier 48. Voltages Vd and Ve are summed and input to input port 48B of differential amplifier 48.

From time point t0 to time point t4, while no acceleration is applied, differential amplifiers 45 and 48 offset voltages Vc to Vf output from C/V converters 44A to 44D. Accordingly, differential amplifier 45 outputs reference voltage Vref generated by reference voltage generator 46 from output port 45C, and differential amplifier 48 outputs reference voltage Vref generated by reference voltage generator 49 from output port 48C.

Voltage Vg outputs from differential amplifier 45 is input to phase shifter 58 connected between differential amplifier 45 and synchronous demodulator 47. Voltage Vi output from differential amplifier 48 is input to phase shifter 59 connected between differential amplifier and synchronous demodulator 50. Voltage Vb is used as reference to synchronously detect a voltage output from differential amplifier 45. Phase shifter 58 shifts the phase of voltage Vg output from differential amplifier 45 so as to match a zero-crossing point where voltage Vb output from driver circuit 41 crosses reference voltage Vref and a zero-crossing point where voltage Vg crosses reference voltage Vref. Phases of voltages Vb and Vg are matched, and voltage Vi is output. Voltage Vb is used as reference to synchronously detect a voltage output from differential amplifier 48. Phase shifter 59 shifts a phase of voltage Vh output from differential amplifier 48 so as to match a zero-crossing point where voltage Vb output from driver circuit 41 crosses reference voltage Vref and a zero-crossing point where voltage Vh crosses reference voltage Vref. Phases of voltage Vb and Vh are matched, and voltage Vj is output.

In acceleration sensor 1003 shown in FIG. 7, phase shifter 58 is connected between differential amplifier 45 and synchronous demodulator 47. Phase shifter 58 can be connected between driver circuit 41 and synchronous demodulator 47. In addition, acceleration sensor 1003 shown in FIG. 7, phase shifter 59 is connected between differential amplifier 48 and synchronous demodulator 50. Phase shifter 59 can be connected between driver circuit 41 and synchronous demodulator 50.

Voltages Vi and Vj output from phase shifters 58 and 59 are input to synchronous demodulators 47 and 50, respectively. Synchronous demodulators 47 and 50 synchronously detect voltages Vi and Vj, respectively, using voltage Vb as reference, and output voltages Vk and Vl, respectively. More specifically, synchronous demodulator 47 generates voltage Vk by inverting a negative portion of voltage Vi to positive. Synchronous demodulator 50 generates voltage Vl by inverting a negative portion of voltage Vj to positive.

Figure 9:
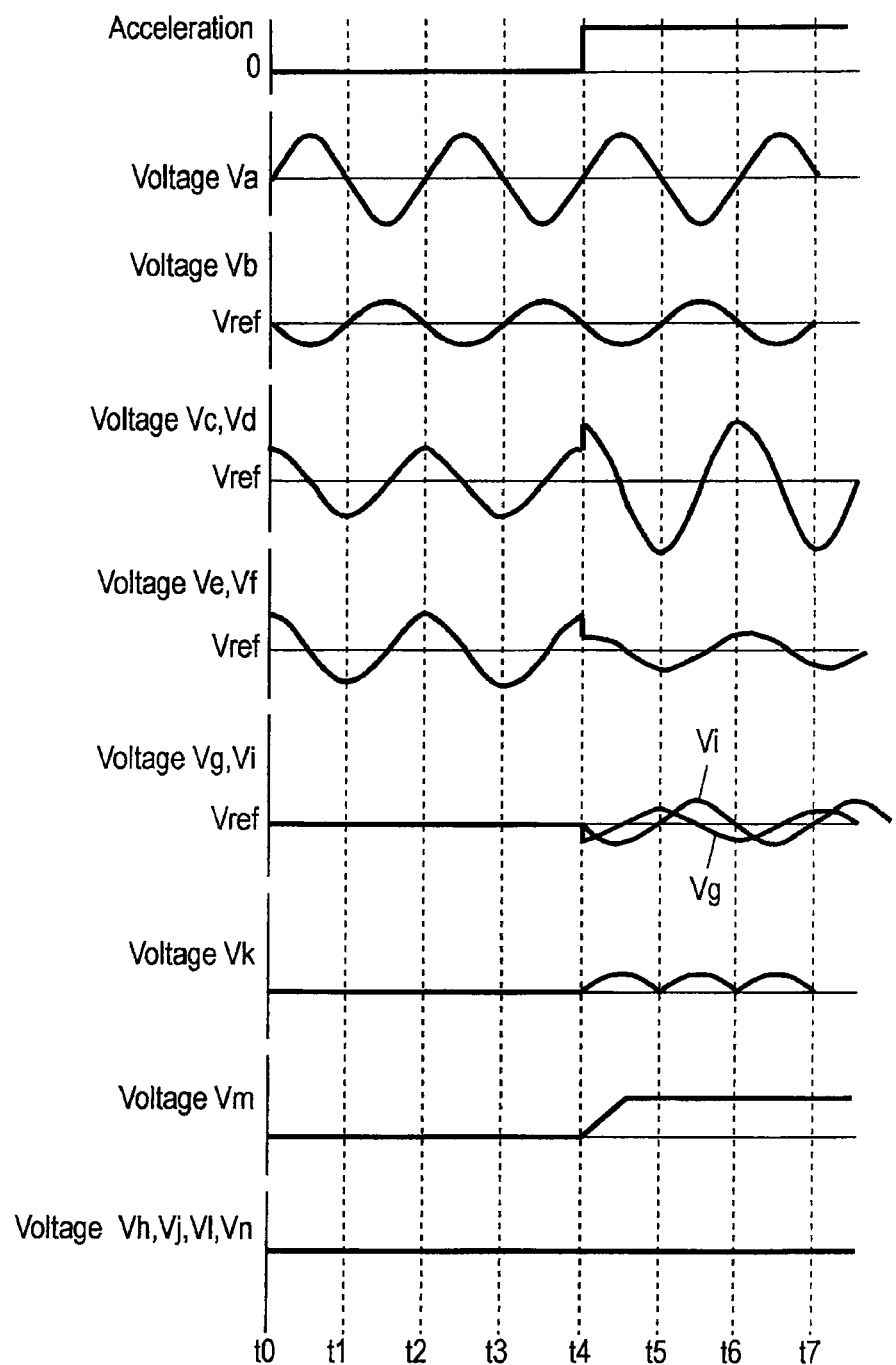
FIG. 9 illustrates voltages of the acceleration sensor in accordance with Embodiment 3 for detecting acceleration.

Voltages Vk and Vl output from synchronous demodulators 47 and 50 are input to amplifiers 60 and 61, respectively. Amplifiers 60 and 61 smoothes voltages Vk and Vl, respectively, and output voltages Vm and Vn from sensor output terminals 51A and 51B, respectively. As shown in FIG. 9, amplifiers 60 and 61 output reference voltage Vref (a virtual ground voltage) as voltages Vm and Vn from time point t0 to time point t4 while no acceleration is applied.

When acceleration in the direction of the Y-axis is applied to detector element 42 at time point t4, movable electrodes 43A and 43B rise and approach fixed electrode 42A. Accordingly, a distance between fixed electrode 42A and each of movable electrodes 43A and 43B decreases. Movable electrodes 43C and 43D move away from fixed electrode 42A. Accordingly, a distance between fixed electrode 42A and each of movable electrodes 43C and 43D increases.

These changes of the distances change a capacitance between fixed electrode 42A and each of movable electrodes 43A to 43D and increases amplitudes of voltages Vc and Vd output from C/V converters 44A and 44B from time point t4. On the other hand, amplitudes of voltages Ve and Vf output from C/V converters 44C and 44D decrease from time point t4.

Voltages Vc and Vd having the increased amplitudes are input to input port 45A of differential amplifier 45. Voltages Ve and Vf having the decreased amplitudes are input to input port 45B of differential amplifier 45. Voltage Vg becomes a sine-wave voltage from time point t4. Voltage Vg being the sine-wave voltage passes through phase shifter 58, synchronous demodulator 47, and amplifier 60, and is output from sensor output terminal 51A as voltage Vm. Voltage Vm becomes higher than reference voltage Vref from time point t4.

On the other hand, voltage Vc having the increased and voltage Vf having the decreased amplitude are input to input port 48A of differential amplifier 48. Voltage Vd having the increased amplitude and voltage Ve having the decreased amplitude are input to input port 48B of differential amplifier 48. Voltage Vh output from differential amplifier 48 does not change and remains to be equal to reference voltage Vref even during a period from time point t4 to time point t7. Hence, voltage Vn output from sensor output terminal 51B does not change during a period from time point t0 to time point t7, either.

It is detectable, based on voltages Vm and Vn output from sensor output terminals 51A and 51B, whether the acceleration in the direction of the Y-axis is applied to detector element 42 or not. If acceleration in a direction opposite to this acceleration is applied to detector element 42, directions of displacements of movable electrodes 43A to 43D are opposite to those described above, and voltage Vm changes oppositely to that shown in FIG. 9.

Next, an operation of acceleration sensor 1003 detecting acceleration in the direction of the X-axis will be described below. Input port 54B of operational amplifier 54 shown in FIG. 7 is connected to reference voltage generator 55. FIG. 10 shows voltages in acceleration sensor 1003 when the acceleration in the direction of the X-axis is applied to detector element 42. During a period from time point t0 to time point t4, no acceleration is applied to detector element 42. Then, acceleration in the direction of the X-axis is applied during a period from time point t4 to time point t7. When the acceleration in the direction of the X-axis is applied to detector element 42, movable electrodes 43A and 43D rise and approach fixed electrode 42A. Accordingly, a distance between fixed electrode 42A and each of movable electrodes 43A and 43D decreases. On the other hand, movable electrodes 43A and 43D move away from fixed electrode 42A, and accordingly, a distance between fixed electrode 42A and each of movable electrodes 43B and 43C increases.

These changes of the distances change a capacitance between fixed electrode 42A and each of movable electrodes 43A to 43D. This operation increases amplitudes of voltages Vc and Vf output from C/V converters 44A and 44D from time point t4, and decreases amplitudes of voltages Vd and Ve output from C/V converters 44B and 44C from time point t4.

Voltages Vc and Vf having the increased amplitudes are input to input port 48A of differential amplifier 48, and voltages Vd and Ve having the decreased amplitudes are input to input port 48B of differential amplifier 48. Voltage Vh output from differential amplifier 48 becomes sine wave from time point t4. Voltage Vh being the sine-wave voltage passes through phase shifter 59, synchronous demodulator 50, and amplifier 61 to be voltage Vn. Voltage Vn is higher than reference voltage Vref from time point t4.

On the other hand, voltage Vc having the increased amplitude and voltage Vd having the decreased amplitude are input to input port 45A of differential amplifier 45. Voltage Vf having the increased amplitude and voltage Ve having the decreased amplitude are input to input port 45B of differential amplifier 45. Voltage Vg output from differential amplifier 45 does not change and remains to be equal to reference voltage Vref even during the period from time point t4 to time point t7. Accordingly, voltage Vm output from sensor output terminal 51A does not change during the period from time point t0 to time point t7, either.

It is detectable, based on voltages Vm and Vn output from sensor output terminals 51A and 51B, whether the acceleration in the direction of the X-axis is applied to detector element 42 or not. If acceleration in a direction opposite to this acceleration is applied to detector element 42, directions of displacements of movable electrodes 43A to 43D become opposite to that described above, and voltage Vn changes oppositely to that shown in FIG. 9.

Figure 11:
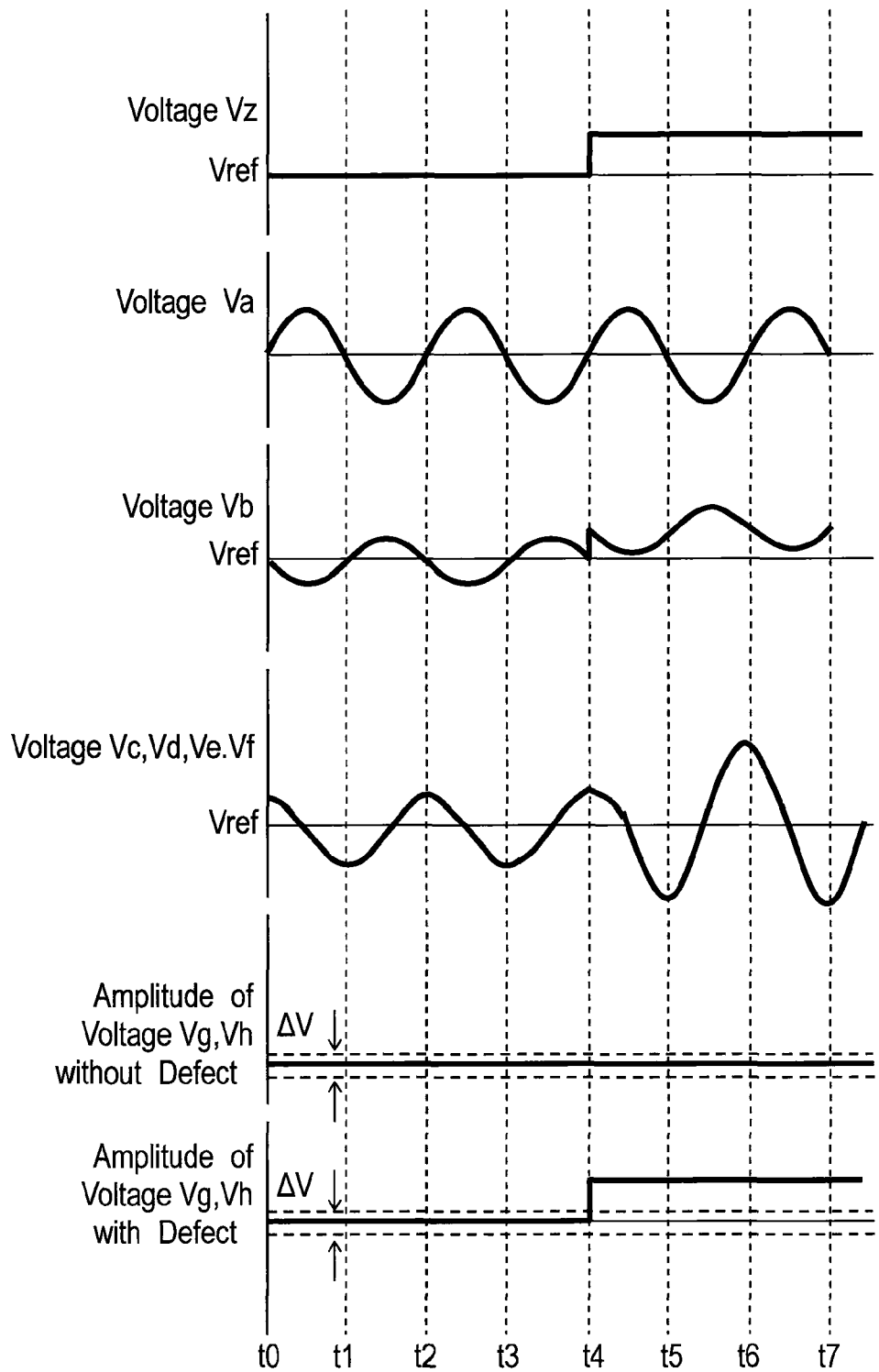
FIG. 11 illustrates waveforms in the acceleration sensor in accordance with Embodiment 3 for detecting defect.

Next, an operation of acceleration sensor 1003 detecting the defect will be described. In order to detect the defect, input port 54B of operational amplifier 54 is connected to movable voltage generator 52. FIG. 11 shows voltages in acceleration sensor 1003 when a defect is detected. Acceleration is not applied to detector element 42 while detecting the defect.

Oscillator 53 inputs sine-wave voltage Va to input port 54A which is an inverting input port of operational amplifier 54. During a period from time point t0 to time point t4, voltage Vz output from movable voltage generator 52 is equal to reference voltage Vref. Operational amplifier 54 inverts sine-wave voltage Va from oscillator 53, and outputs voltage Vb from the output port thereof.

When voltage Vb is applied to fixed electrode 42A of detector element 42, sine-wave currents are output from each of movable electrodes 43A to 43D of detector element 42 based on voltage Vb and a capacitance determined by a distance between fixed electrode 42A and each of movable electrodes 43A to 43D. C/V converters 44A to 44D convert the sine-wave currents from movable electrodes 43A to 43D to voltages Vc to Vf, respectively.

Then, voltages Vc and Vd are summed and input to input port 45A of differential amplifier 45. Voltages Ve and Vf are summed and input to input port 45B of differential amplifier 45.

At this moment, voltages Vc and Vf are summed and input to input port 48A of differential amplifier 48. Voltages Vd and Ve are summed and input to input port 48B of differential amplifier 48.

At time point t4, voltage Vz of variable voltage generator 52 of driver circuit 41 is increased to decrease a distance between fixed electrode 42A and each of movable electrodes 43A to 43D, accordingly increasing a capacitance between fixed electrode 42A and each of movable electrodes 43A to 43D. This operation increases amplitudes of voltages Vc to Vf output from C/V converters 44A to 44D.

If detector element 42 ha no defect, differential amplifiers 45 and 48 offsets of the changes of the amplitudes of voltages Vc to Vf. Hence, voltages Vg and Vh output from differential amplifiers 45 and 48 do not change even during a period from time point t4 to time point t7 after the period from time point t0 to time point t4, and stays within predetermined range ΔV. When defect detectors 56 and 57 detect that voltages Vg and Vh are within predetermined range ΔV during the period from time point t4 to time point t7, defect detectors 56 and 57 determine that detector element 42 has no defect, and do not output defect detection signals.

On the other hand, if detector element 42 has a defect, for example, if at least one of movable electrodes 43A to 43D does not operate properly, differential amplifier 45 cannot offset voltages Vc to Vf output from C/V converters 44A to 44D, and thus, prevents the amplitude of voltage Vg from staying within predetermined range ΔV from time point t4. Accordingly, defect detector 56 can detect the defect, and outputs a defect detection signal. In addition, differential amplifier 48 cannot offset voltages Vc to Vf output from C/V converters 44A to 44D, and thus, prevents the amplitude of voltage Vh from staying within predetermined range ΔV from time point t4. Accordingly, defect detector 57 can detect the defect, and outputs a defect detection signal. Furthermore, amplitudes of voltages Vg and Vh output from differential amplifiers 45 and 48 increase at time point t4 when variable voltage generator 52 of driver circuit 41, accordingly allowing defect detectors 56 and 57 to detect the defect easily.

As described above, acceleration sensor 1003 does not require two ore more variable voltage generators having a certain volume in order to detect the defect, thus having a small size as well as detecting acceleration along two axes, the X-axis and the Y-axis.

Figure 12:
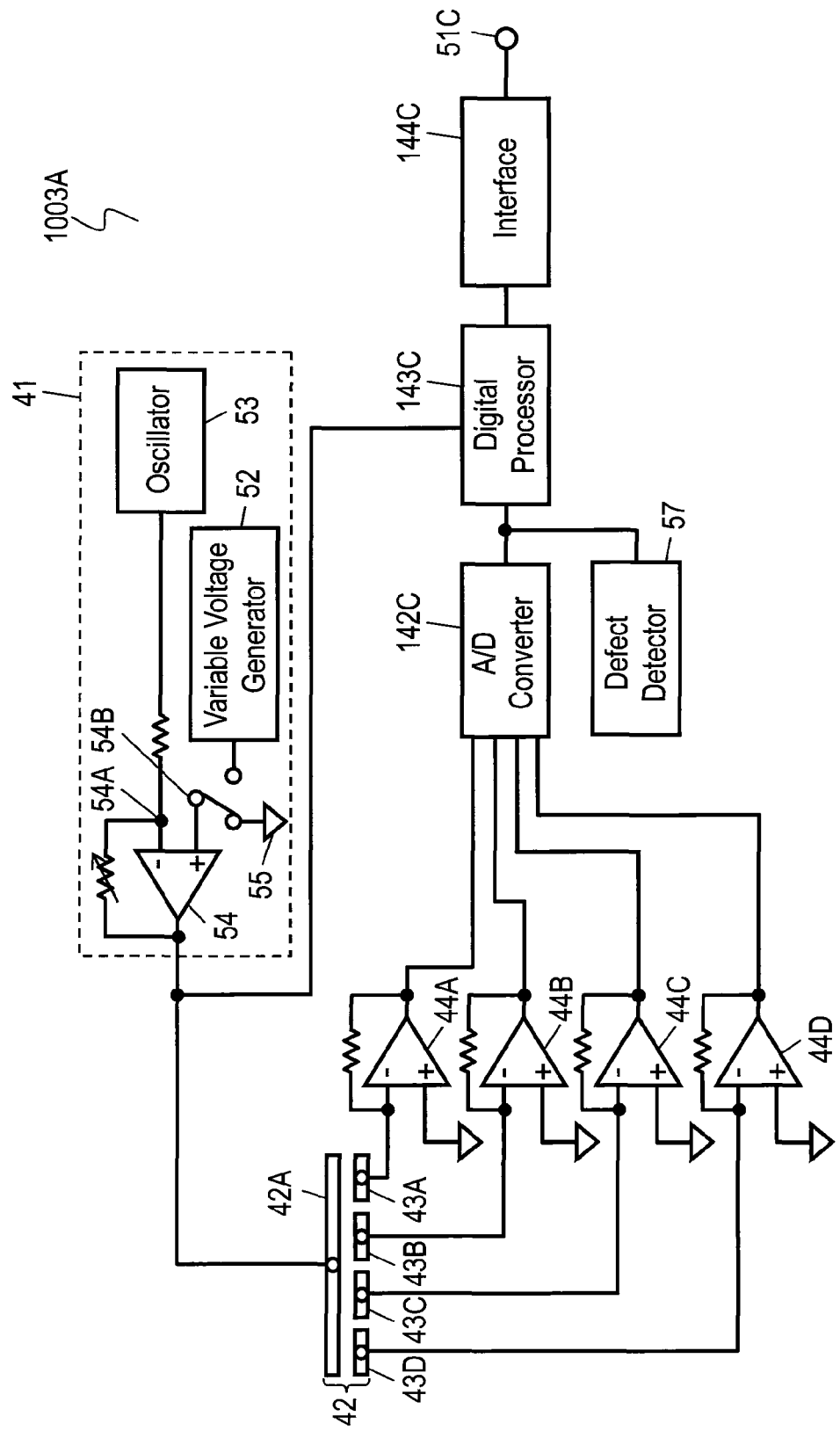
FIG. 12 is a circuit diagram of another acceleration sensor in accordance with Embodiment 3.

FIG. 12 is a circuit diagram of another acceleration sensor 1003A according to Exemplary Embodiment 3. In FIG. 12, components identical to those of acceleration sensor 1003 shown in FIG. 7 are denoted by the same reference numerals, and their description will be omitted. Acceleration sensor 1003 shown in FIG. 7 is implemented by an analog circuit. Acceleration sensor 1003A includes analog-digital (A/D) converter 142C, digital processor 143C, and interface 144C instead of differential amplifiers 45 and 48 and synchronous demodulator 47 in acceleration sensor 1003 shown in FIG. 7. A/D converter 142C converts the sum of voltages Vc, Vd, Ve, and Vf output from C/V converters 44A, 44B, 44C, and 44D into a digital signal. Digital processor 143C includes a digital filter and a digital synchronous demodulator for synchronously demodulating the output of analog-digital converter 142B. Interface 144C converts a signal output from digital processor 143C into a signal in a predetermined digital format. Thus, acceleration sensor 1003A shown in FIG. 12 is implemented by a digital circuit, and provides the same effects as acceleration sensor 1003. The summing of voltages Vc to Vf output from C/V converters 44A to 44D can be executed in any of A/D converter 142C, digital processor 143C, and interface 144C. However, since all of voltages Vc and Vd need to be summed in A/D converter 142C for detecting the defect by defect detectors 57 and 58, the summing for detecting acceleration described above is executed in digital processor 143C or interface 144C.

Exemplary Embodiment 4

Figure 13:
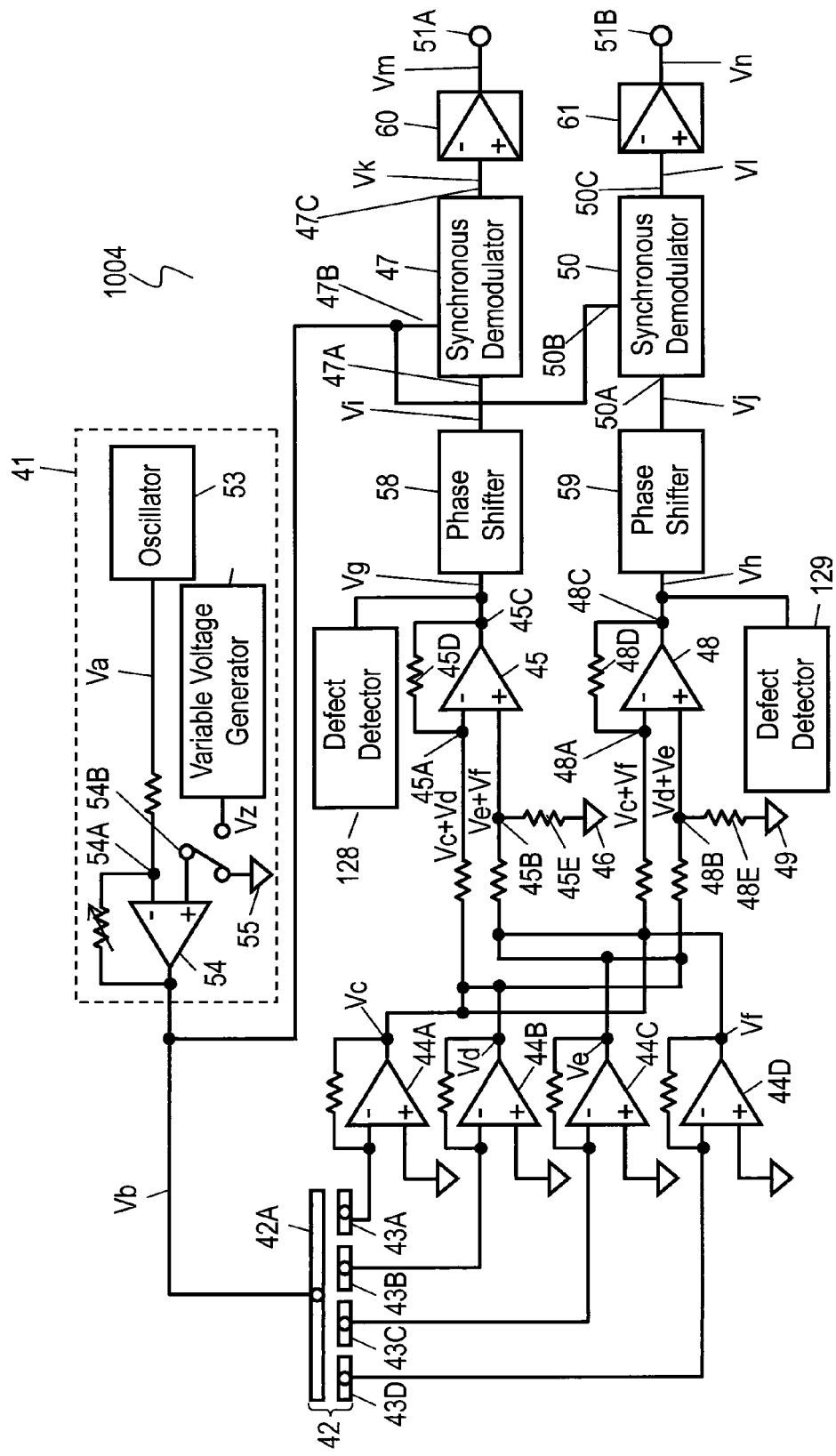
FIG. 13 is a circuit diagram of an acceleration sensor in accordance with Exemplary Embodiment 4 of the invention.

FIG. 13 is a circuit diagram of acceleration sensor 1004 according to Exemplary Embodiment 4 of the present invention. In FIG. 13, components identical to those of acceleration sensor 1003 according to Embodiment 3 shown in FIG. 7 will be denoted by the same reference numerals, and their description will be omitted. Acceleration sensor 1004 according to Embodiment 4 includes defect detectors 128 and 129 instead of defect detectors 56 and 57 of acceleration sensor 1003 according to Embodiment 3 shown in FIG. 7. Defect detectors 128 and 129 are connected to output ports 45C and 48C of differential amplifiers 45 and 48, respectively, similarly to defect detectors 56 and 57 in acceleration sensor 1003 according to Embodiment 3.

Acceleration sensor 1004 according to Embodiment 4 can detect acceleration in the direction of the X-axis and acceleration in the direction of the Y-axis applied to detector element 42 shown in FIG. 8 in the same manner as acceleration sensor 1003 according to Embodiment 3 shown in FIGS. 9 and 10.

Figure 14:
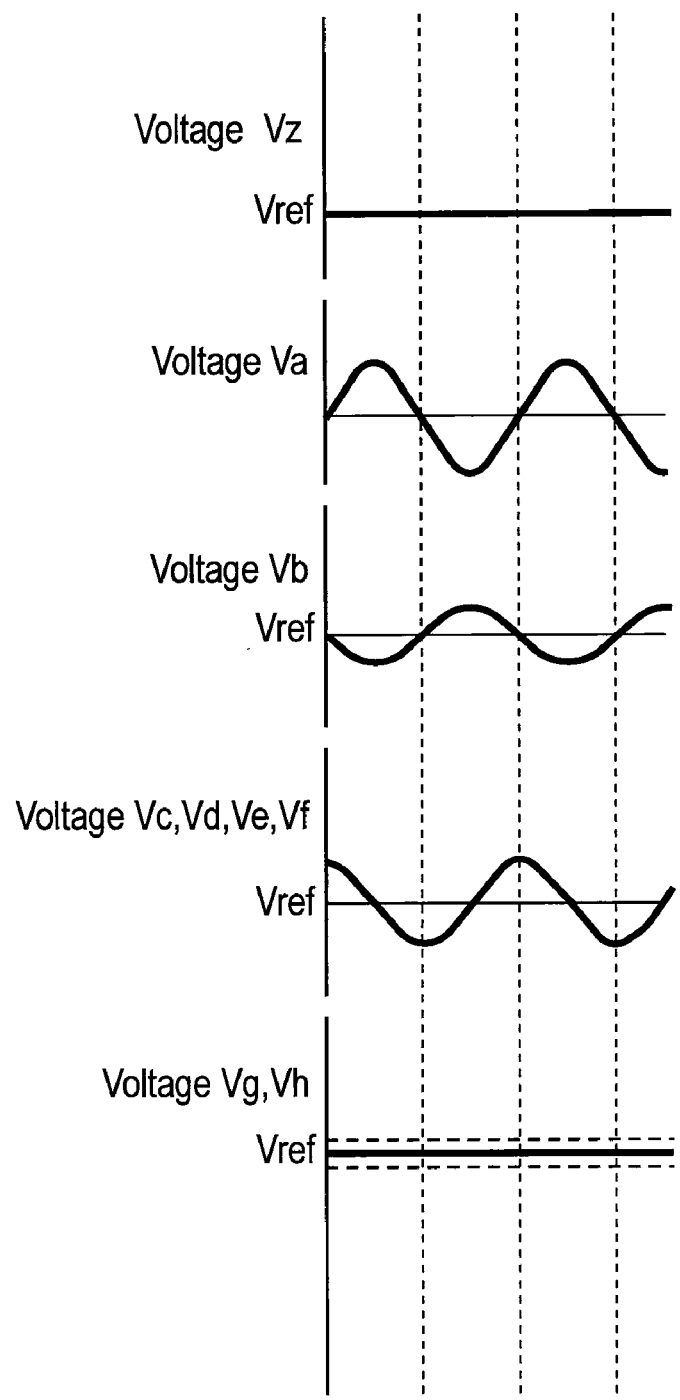
FIG. 14 illustrates voltages in the acceleration sensor in accordance with Embodiment 4 for detecting defect.

An operation of acceleration sensor 1004 detecting a defect will be described below. FIG. 14 shows voltages in acceleration sensor 1004 while detecting a defect. Acceleration is not applied to detector element 42 while detecting a defect.

Oscillator 53 inputs sine-wave voltage Va to input port 54A which is an inverting input port of operational amplifier 54. During a period from time point t0 to time point t4, voltage Vz output from variable voltage generator 52 is equal to reference voltage Vref. Operational amplifier 54 inverts sine-wave voltage Va from oscillator 54, and outputs voltage Vb from the output port thereof.

When voltage Vb is applied to fixed electrode 42A of detector element 42, sine-wave currents are output from movable electrodes 43A to 43D of detector element 42 based on voltage Vb and a capacitance determined by a distance between fixed electrode 42A and each of movable electrodes 43A to 43D and fixed electrode 42A. C/V converters 44A to 44D convert the sine-wave currents from movable electrodes 43A to 43D to voltages Vc to Vf, respectively.

Voltages Vc and Vd are summed and input to input port 45A of differential amplifier 45. Voltages Ve and Vf are summed and input to input port 45B of differential amplifier 45.

At this moment, voltages Vc and Vf are summed and input to input port 48A of differential amplifier 48. Voltages Vd and Ve are summed and input to input port 48B of differential amplifier 48.

If detector element 42 has no defect, differential amplifiers 45 and 48 offset the changes of amplitudes of voltages Vc to Vf, and thus, voltages Vg and Vh output from differential amplifiers 45 and 48 stay within predetermined range ΔV. When defect detectors 56 and 57 detect that voltages Vg and Vh are within predetermined range ΔV, defect detectors Vg and Vh determine that detector element 42 has no defect, and do not output defect detection signals.

On the other hand, if detector element 42 has a defect, for example, if at least one of movable electrodes 43A to 43D does not operate properly, differential amplifier 45 cannot offset voltages Vc to Vf output from C/V converters 44A to 44D, to thus, prevents the amplitude of voltage Vg from staying within predetermined range ΔV from time point t4. Accordingly, defect detector 56 can detect the defect, and outputs a defect detection signal. In addition, differential amplifier 48 cannot offset voltages Vc to Vf output from C/V converters 44A to 44D, and thus, prevents the amplitude of voltage Vh from staying within predetermined range ΔV from time point t4. Accordingly, defect detector 57 can detect the defect, and output a defect detection signal. Thus, at least one of defect detectors 56 and 57 can detect the defect of detector element 42, and output the defect detection signal.

Figure 15:
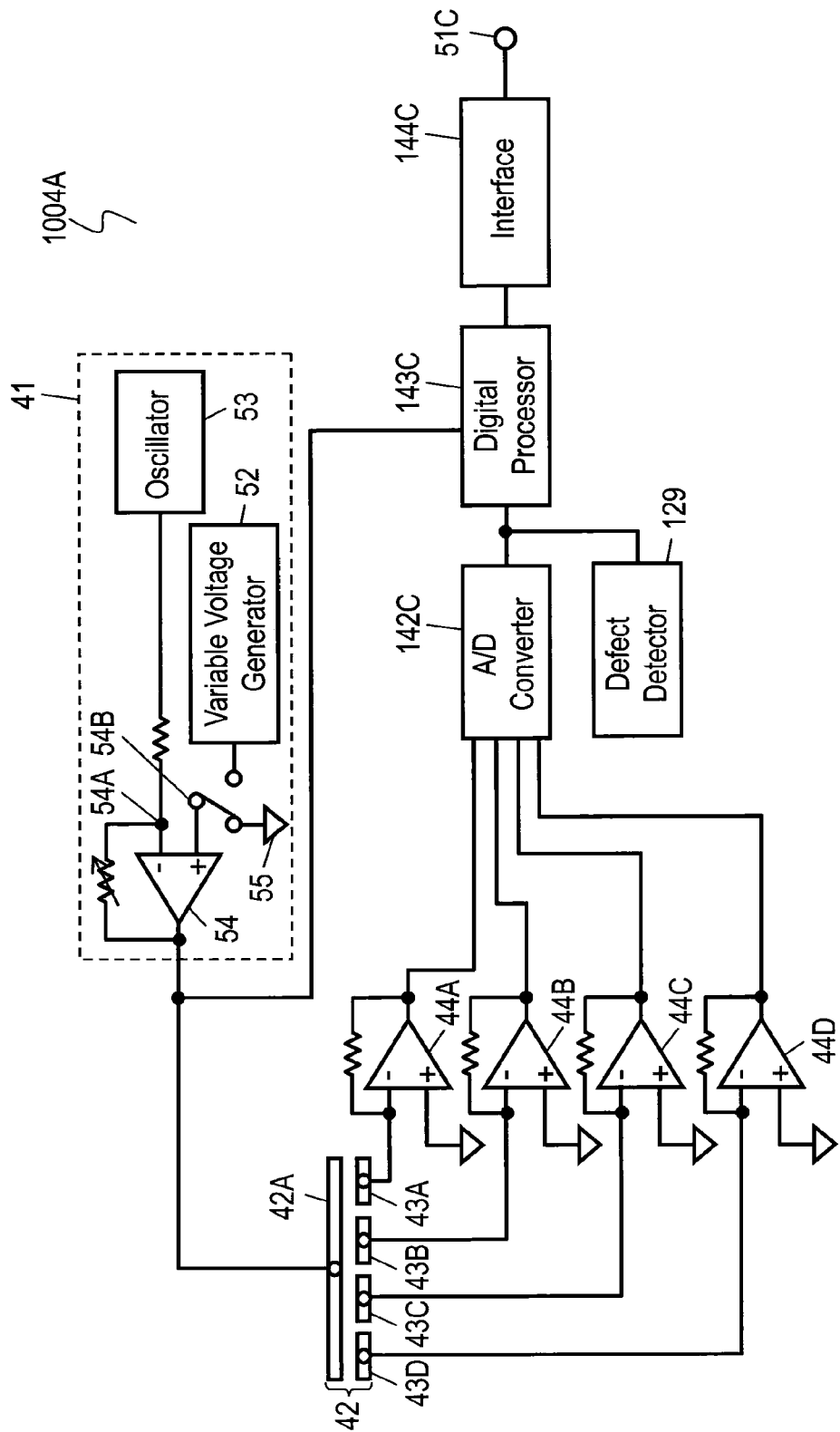
FIG. 15 is a circuit diagram of another acceleration sensor in accordance with Embodiment 4.
Figure 16:
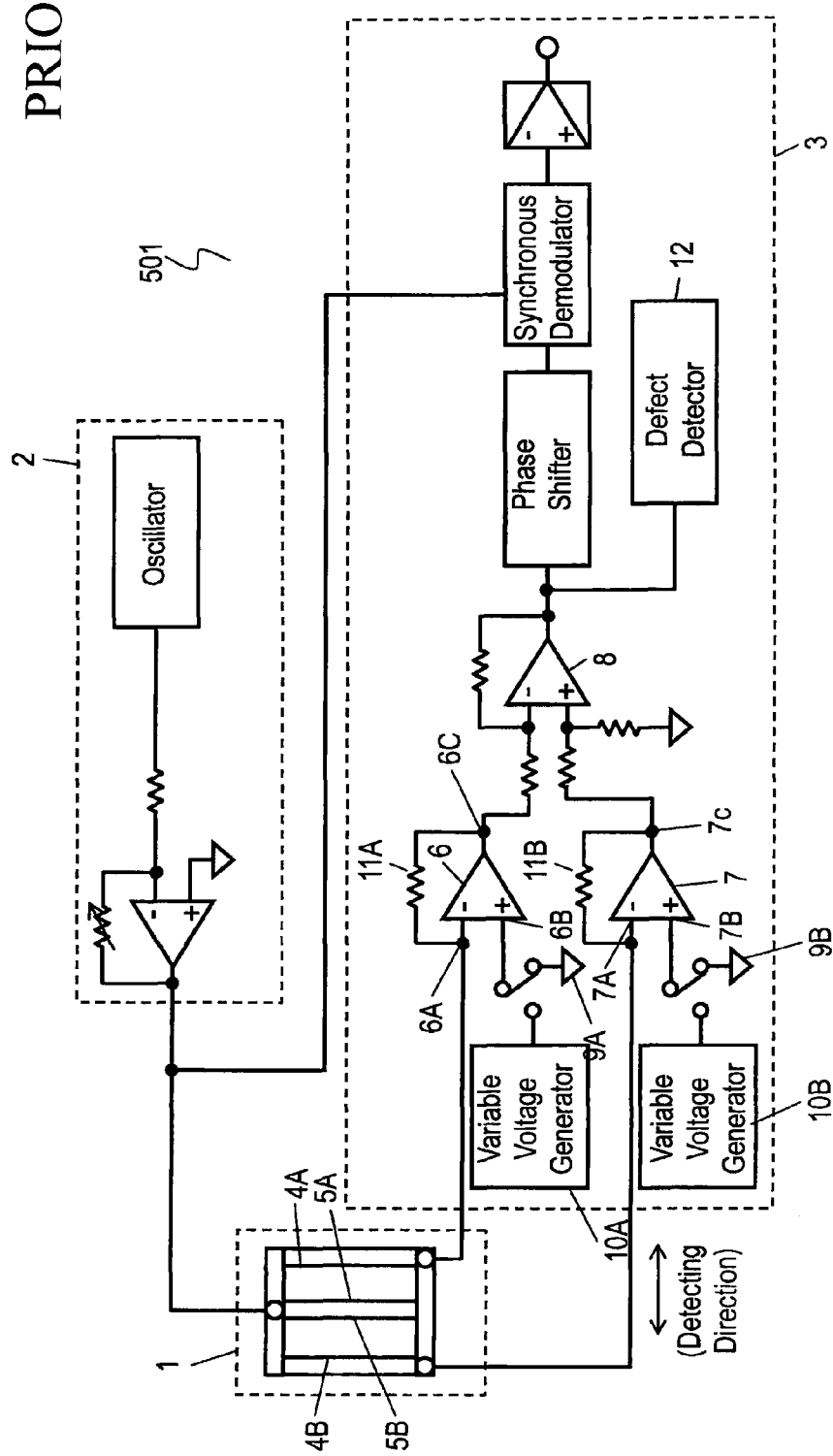
FIG. 16 is a circuit diagram of a conventional acceleration sensor.

FIG. 15 is a circuit diagram of another acceleration sensor 1004A according to Embodiment 4. In FIG. 15, components identical to those of acceleration sensor 1004 shown in FIG. 13 are denoted by the same reference numerals, and their description will be omitted. Acceleration sensor 1004 shown in FIG. 13 is implemented by an analog circuit. Acceleration sensor 1004A includes analog-digital (A/D) converter 142C, digital processor 143C, and interface 144C instead of differential amplifiers 45 and 48 and synchronous demodulators 47 and 50 of acceleration sensor 1004 shown in FIG. 13. A/D converter 142C converts the voltage provided by summing voltages Vc, Vd, Ve, and Vf output from C/V converters 44A, 44B, 44C, and 44D into a digital signal. Digital processor 143C includes a digital filter and a digital synchronous demodulator for synchronously demodulating the output of analog-digital converter 142B. Interface 144C converts a signal output form digital processor 143 into a signal in a predetermined digital format. Thus, acceleration sensor 1004A shown in FIG. 15 is implemented by a digital circuit, and provides the same effects as acceleration sensor 1004. The summing of voltages Vc to Vf output from C/V converters 44A to 44D can be executed in any of analog-digital converter 142C, digital processor 143C, and interface 144C. However, since all of voltages Vc and Vd need to be summed by A/D converter 142C for detecting the defect by defect detectors 57 and 58, the summing for detecting the acceleration is executed in digital processor 143C or interface 144C.

INDUSTRIAL APPLICABILITY

An acceleration sensor according to the present invention has a small size and is useful to an acceleration sensor mounted to moving bodies, such as vehicles.

The invention claimed is:

1. An acceleration sensor comprising:
a driver circuit for outputting a biased alternating-current (AC) voltage having a variable bias voltage;
a detector element including
a fixed electrode having the biased AC voltage is applied thereto, and
a first movable electrode facing the fixed electrode, wherein a capacitance provided between the fixed electrode and the first movable electrode changes depending on acceleration applied to the detector element;
a first current-voltage (CN) converter for converting a current output from the first movable electrode of the detector element into a voltage, and outputting the voltage;
a first operational amplifier including
a first input port having the voltage output from the first CN converter input thereto, and
an output port for outputting a voltage depending on the input voltage;
a synchronous demodulator for synchronously detecting the voltage output from the first operational amplifier; and
a defect detector for outputting a defect detection signal when the defect detector determines that the voltage output from the first operational amplifier is out of a predetermined range while the biased AC voltage output from the driver circuit is a predetermined voltage, wherein the driver circuit includes
an oscillator for generating an AC voltage, and
a second operational amplifier including
a first input port having the AC voltage generated by the oscillator input thereto,
a second input port having selectively a reference voltage and a variable voltage input thereto, and
an output port connected to the fixed electrode of the detector element.

2. The acceleration sensor according to claim 1, the first operational amplifier further includes a second input port having a reference voltage applied thereto.

3. The acceleration sensor according to claim 1, further comprising a second C/V converter, wherein
the detector element further includes a second movable electrode facing the fixed electrode, a capacitance generated between the fixed electrode and the second movable electrode being changed depending on the acceleration,
the second C/V converter converts a current output from the second movable electrode of the detector element into a voltage, and outputs the converted voltage to the first input port of the first operational amplifier, and
the first operational amplifier sums the voltage output from the first C/V converter and the voltage output from the second C/V converter, and outputs the summed voltages from the output port.

4. The acceleration sensor according to claim 1, wherein the variable voltage is different from the reference voltage.

5. The acceleration sensor according to claim 1,
wherein the driver circuit is operable to
output a first biased AC voltage when the variable voltage is input to the second input port of the second operational amplifier, and
output a second biased AC voltage when the reference voltage is input to the second input port of the second operational amplifier, and
wherein the defect detector outputs the defect detection signal when the defect detector determines that the voltage output from the first operational amplifier is out of the predetermined range while the first biased AC voltage is output from the driver circuit.

6. The acceleration sensor according to claim 5, wherein the synchronous demodulator outputs a signal corresponding to the acceleration by synchronously detecting the voltage output from the first operational amplifier while the second biased AC voltage is output from the driver circuit.

7. An acceleration sensor comprising:
a driver circuit for outputting a biased alternating-current (AC) voltage having a variable bias voltage;
a detector element including a fixed electrode having the biased AC voltage applied thereto,
a first movable electrode facing the fixed electrode,
a second movable electrode facing the fixed electrode,
a third movable electrode facing the fixed electrode, and
a fourth movable electrode facing the fixed electrode, wherein a capacitance generated between the fixed electrode and each of the first movable electrode, the second movable electrode, the third movable electrode, and the fourth movable electrode changes depending on acceleration applied to the detector element;

a first current-voltage (CN) converter for converting a current from the first movable electrode of the detector element to a voltage, and outputting the converted voltage;

a second C/V converter for converting a current from the second movable electrode of the detector element to a voltage, and outputting the converted voltage;

a third C/V converter for converting a current from the third movable electrode of the detector element to a voltage, and outputting the converted voltage;

a fourth C/V converter for converting a current from the fourth movable electrode of the detector element to a voltage, and outputting the converted voltage;

a first differential amplifier including
- a first input port having a voltage provided by summing the voltage output from the first C/V converter and the voltage output from the second C/V converter input thereto,
- a second input port having a voltage provided by summing the voltage output from the third C/V converter and the voltage output from the fourth C/V converter input thereto, and
- an output port for outputting a voltage which is a difference between the voltage input to the first input port and the voltage input to the second input port;

a second differential amplifier including
- a first input port having a voltage provided by summing the voltage output from the first C/V converter and the voltage output from the fourth C/V converter input thereto,
- a second input port having a voltage provided by summing the voltage output from the second C/V converter and the voltage output from the third C/V converter input thereto, and
- an output port for outputting a voltage which is a difference between the voltage input to the first input port and the voltage input to the second input port;

a first defect detector for outputting a defect detection signal when the first defect detector determines that the voltage output from the output port of the first differential amplifier is out of a predetermined range while the biased voltage output from the driver circuit is a predetermined voltage; and a second defect detector for outputting a defect detection signal when the second defect detector determines that the voltage output from the output port of the second differential amplifier is out of a predetermined range while the biased AC voltage output from the driver circuit is the predetermined voltage, wherein the driver circuit includes an oscillator for generating an AC voltage, and an operational amplifier including
- a first input port having the AC voltage generated by the oscillator input thereto,
- a second input port having a reference voltage and a variable voltage selectively input thereto, and
- an output port connected to the fixed electrode of the detector element.

8. The acceleration sensor according to claim 7, further comprising:
- a first synchronous demodulator for synchronously detecting the voltage output from the output port of the first differential amplifier; and
- a second synchronous demodulator for synchronously detecting the voltage output from the output port of the second differential amplifier.

9. The acceleration sensor according to claim 8, further comprising:
- a first phase shifter for matching a phase of the voltage output from the first differential amplifier and a phase of the biased AC voltage output from the driver circuit;
- a first amplifier for smoothing the voltage synchronously detected by the first synchronous demodulator;
- a second phase shifter for matching a phase of the voltage output from the second differential amplifier and the phase of the biased AC voltage output from the driver circuit; and
- a second amplifier for smoothing the voltage synchronously detected by the second synchronous demodulator, wherein the first synchronous demodulator synchronously detects the voltage output from the output port of the first differential amplifier based on the biased AC voltage output from the driver circuit as a reference, and the second synchronous demodulator synchronously detects the voltage output from the output port of the second differential amplifier based on the biased AC voltage output from the driver circuit as a reference.

10. The acceleration sensor according to claim 7, wherein the variable voltage is different from the reference voltage.

11. The acceleration sensor according to claim 7,
wherein the driver circuit is operable to
- output a first biased AC voltage when the variable voltage is input to the second input port of the second operational amplifier, and
- output a second biased AC voltage when the reference voltage is input to the second input port of the second operational amplifier, wherein the first defect detector outputs the defect detection signal when the first defect detector determines that the voltage output from the first operational amplifier is out of the predetermined range while the first biased AC voltage is output from the driver circuit, and wherein the second defect detector outputs the defect detection signal when the second defect detector determines that the voltage output from the second operational amplifier is out of the predetermined range while the first biased AC voltage is output from the driver circuit.

12. The acceleration sensor according to claim 8,
wherein the driver circuit is operable to
- output a first biased AC voltage when the variable voltage is input to the second input port of the second operational amplifier, and
- output a second biased AC voltage when the reference voltage is input to the second input port of the second operational amplifier, wherein the first defect detector outputs the defect detection signal when the first defect detector determines that the voltage output from the first operational amplifier is out of the predetermined range while the first biased AC voltage is output from the driver circuit, and wherein the second defect detector outputs the defect detection signal when the second defect detector determines that the voltage output from the second operational amplifier is out of the predetermined range while the first biased AC voltage is output from the driver circuit.

13. The acceleration sensor according to claim 12, wherein the first synchronous demodulator outputs a signal corresponding to the acceleration by synchronously detecting the voltage output from the first operational amplifier while the second biased AC voltage is output from the driver circuit, and wherein the second synchronous demodulator outputs a signal corresponding to the acceleration by synchronously detecting the voltage output from the second operational amplifier while the second biased AC voltage is output from the driver circuit.

* * * * *

UNITED STATES PATENT AND TRADEMARK OFFICE
CERTIFICATE OF CORRECTION

PATENT NO. : 8,327,708 B2
APPLICATION NO. : 12/594862
DATED : December 11, 2012
INVENTOR(S) : Isao Hattori et al.

It is certified that error appears in the above-identified patent and that said Letters Patent is hereby corrected as shown below:

In column 15, line 60, please delete "CN" and instead insert --C/V--

In column 15, line 65, please delete "CN" and instead insert --C/V--

In column 17, line 4, please delete "CN" and instead insert --C/V--

Signed and Sealed this
Twelfth Day of March, 2013

Teresa Stanek Rea
*Acting Director of the United States Patent and Trademark Office*